United States Patent
Freitag

(10) Patent No.: US 9,341,400 B2
(45) Date of Patent: May 17, 2016

(54) MOBILE HYDRO GEOTHERMAL TESTING SYSTEMS AND METHODS

(75) Inventor: Scott Freitag, Little Falls, MN (US)

(73) Assignee: Braun Intertec Geothermal, LLC, Minneapolis, MN (US)

( * ) Notice: Subject to any disclaimer, the term of this patent is extended or adjusted under 35 U.S.C. 154(b) by 965 days.

(21) Appl. No.: 13/205,568

(22) Filed: Aug. 8, 2011

(65) Prior Publication Data

US 2012/0079880 A1 Apr. 5, 2012

Related U.S. Application Data

(60) Provisional application No. 61/371,539, filed on Aug. 6, 2010.

(51) Int. Cl.
| | | |
|---|---|---|
| *G01F 25/00* | (2006.01) | |
| *F25B 45/00* | (2006.01) | |
| *F24J 3/08* | (2006.01) | |

(52) U.S. Cl.
CPC ............ *F25B 45/00* (2013.01); *F24J 3/082* (2013.01); *Y02E 10/125* (2013.01)

(58) Field of Classification Search
CPC .................... G01F 25/0015; G01M 3/207
USPC ............................................ 73/1.17
See application file for complete search history.

(56) References Cited

U.S. PATENT DOCUMENTS

| 5,244,037 | A | 9/1993 | Warnke | |
| 6,138,744 | A | 10/2000 | Coffee | |
| 7,263,873 | B2 | 9/2007 | Richey | |
| 8,005,640 | B2 | 8/2011 | Chiefetz et al. | |
| 2009/0095442 | A1* | 4/2009 | Wiggs | 165/45 |
| 2009/0165992 | A1 | 7/2009 | Song | |
| 2010/0108290 | A1* | 5/2010 | Maxwell | 165/62 |
| 2011/0220320 | A1* | 9/2011 | Kidwell | 165/45 |

OTHER PUBLICATIONS

ASTM International, "Standard Practice for Field Leak Testing of Polyethylene (PE) Pressure Piping Systems Using Hydrostatic Pressure", pp. 5, 2007.

* cited by examiner

*Primary Examiner* — Hezron E Williams
*Assistant Examiner* — Rodney T Frank
(74) *Attorney, Agent, or Firm* — Fredrikson & Byron, P.A.

(57) ABSTRACT

A fluid flushing and pressurization apparatus for use with geothermal systems, capable of delivering a reversible high-velocity flow of fluid through a system of buried PE pipe without introducing an overpressure condition or water hammer. The apparatus can be utilized with methods for installing, preparing, flushing, filling, testing, and certifying geothermal heating and cooling systems. A portable pumping and testing apparatus can include a high-volume pump, a high-pressure pump, a flow meter, and pressure sensors in wired or wireless communication with a processor or logic controller such that continuous or periodic monitoring of the system can be recorded. The system can be programmed to operate automatically under computer control such that reversal of the flow through the geothermal system does not shock or damage the equipment or buried piping.

23 Claims, 43 Drawing Sheets

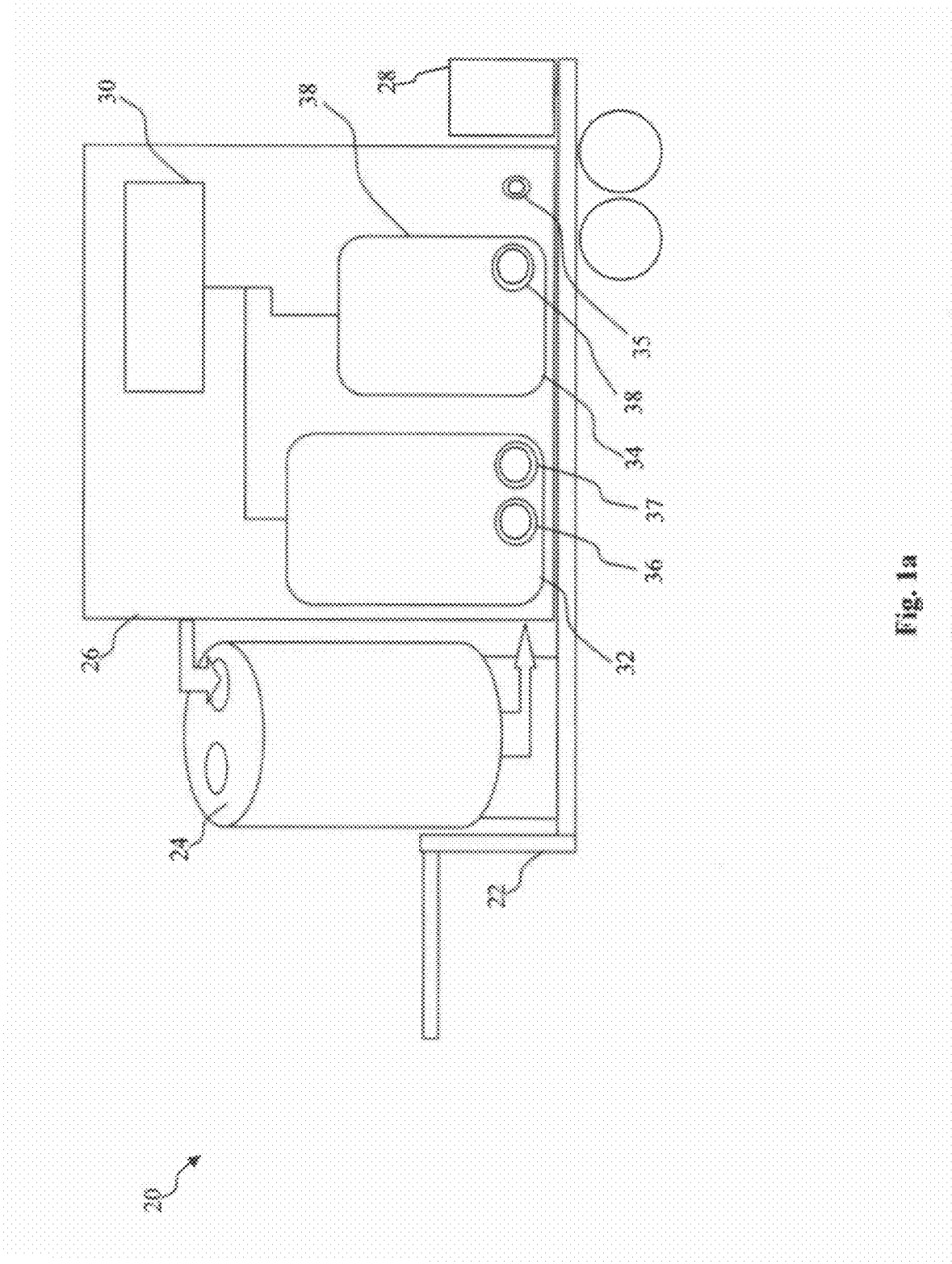

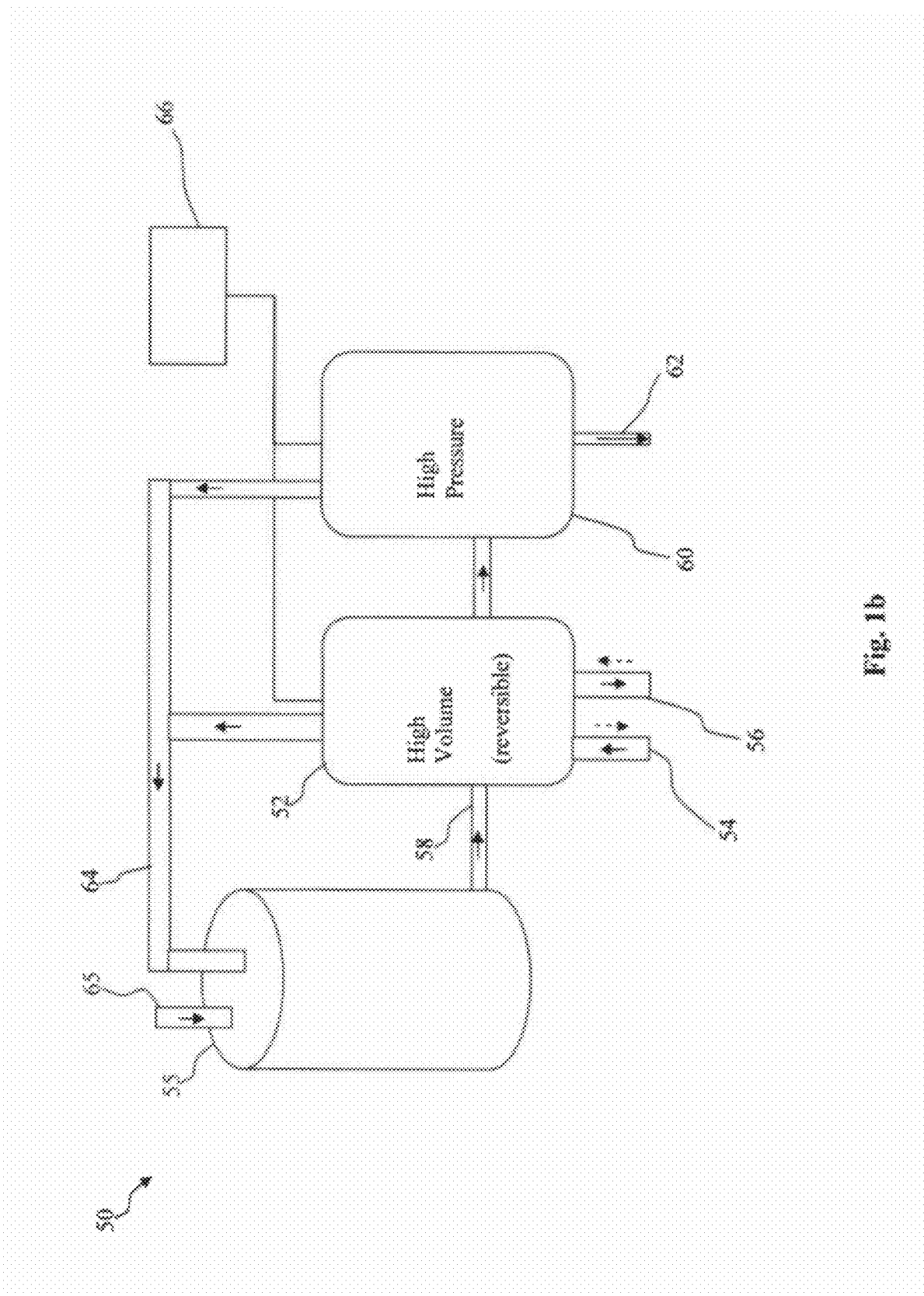

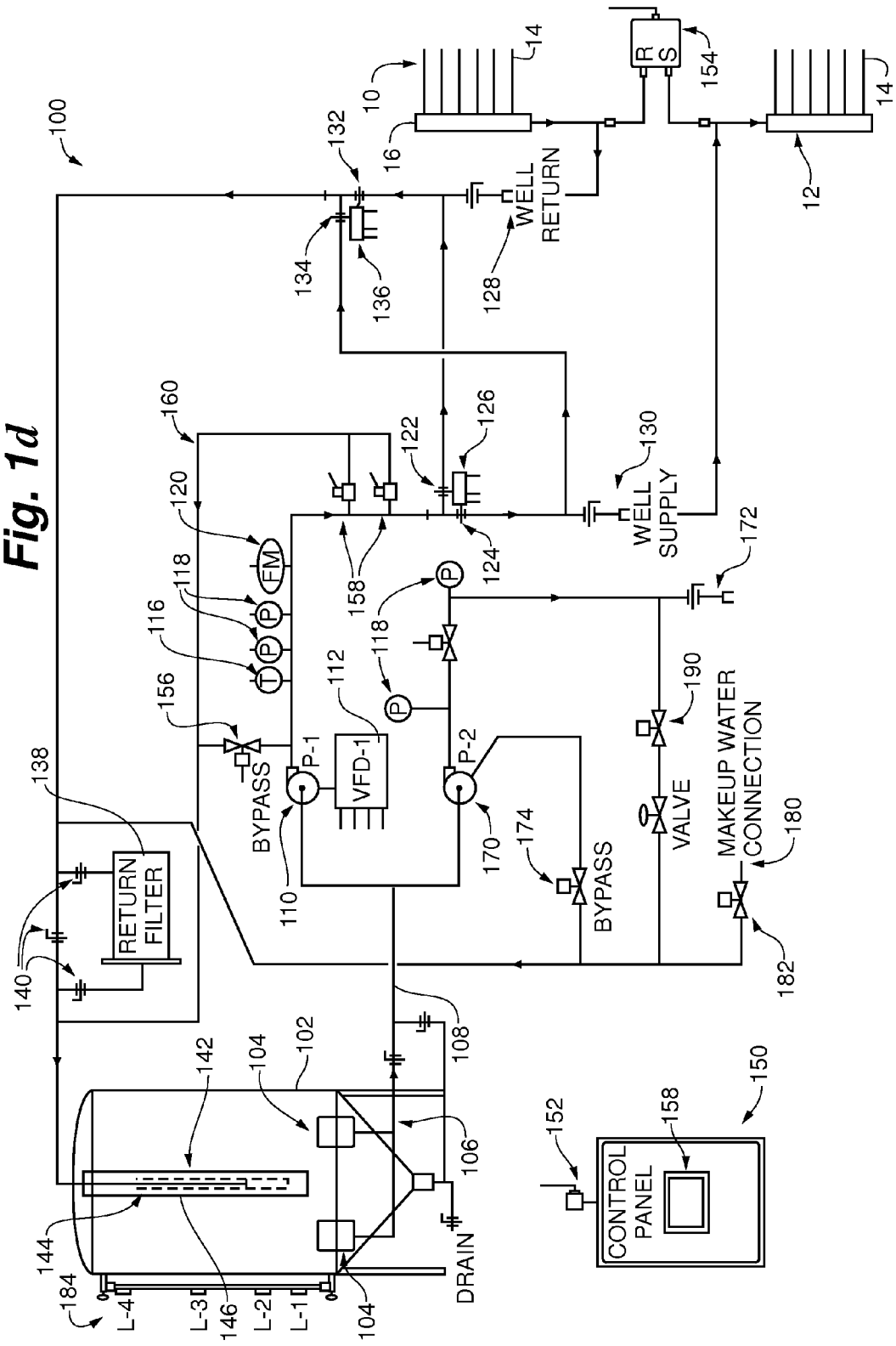

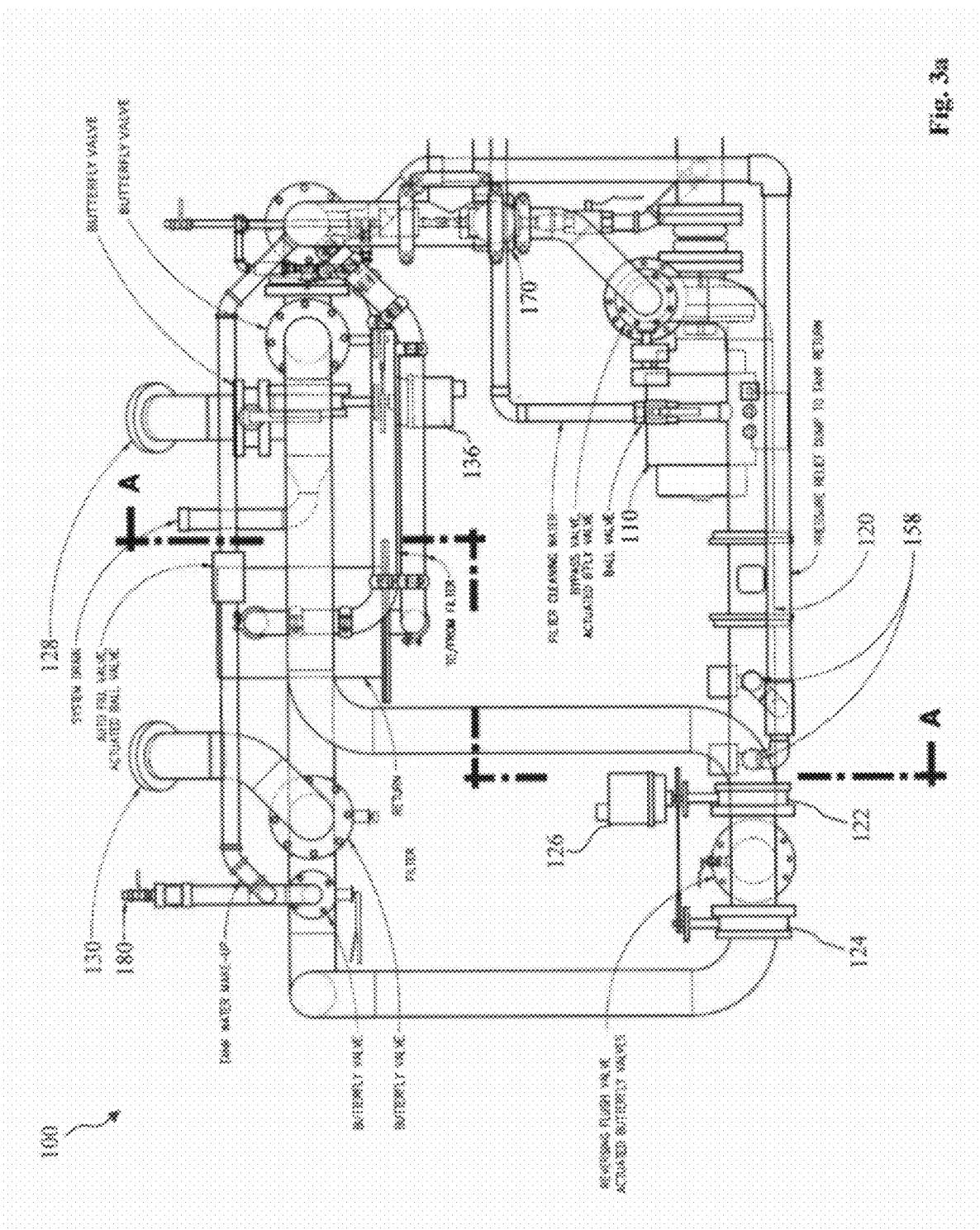

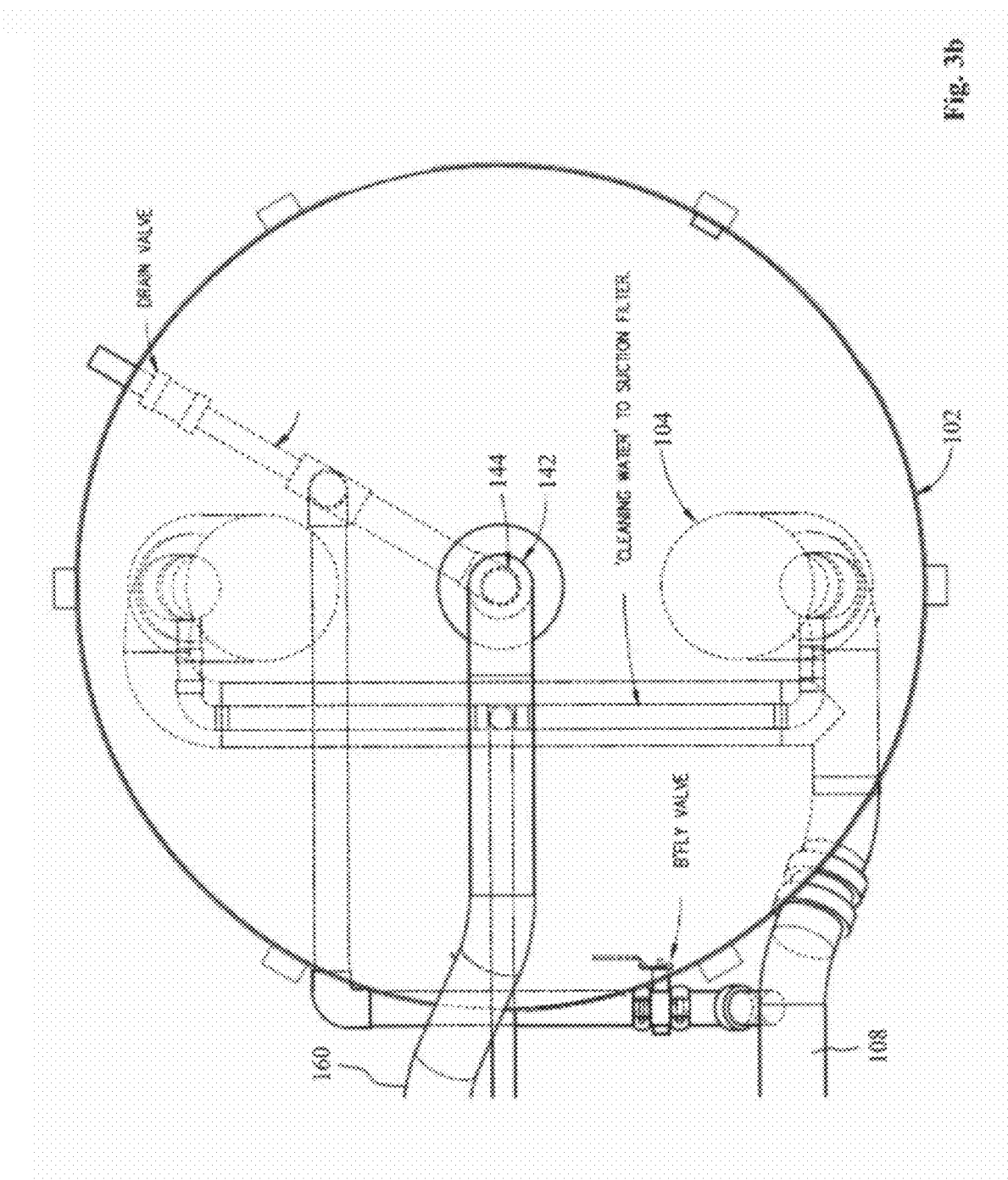

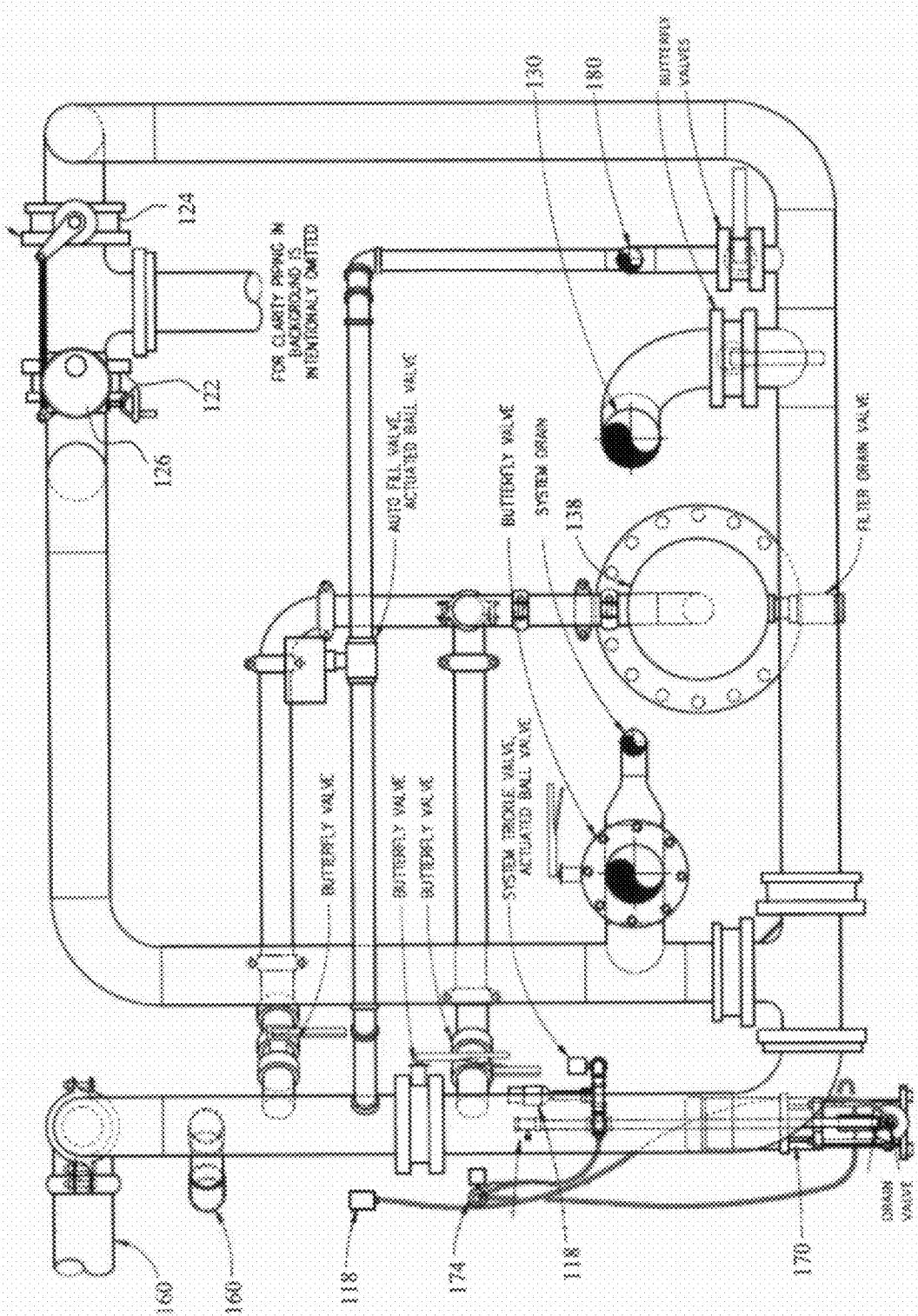

(LAYOUT OF FIGS. 8a-8b-8c)

*Fig. 12*
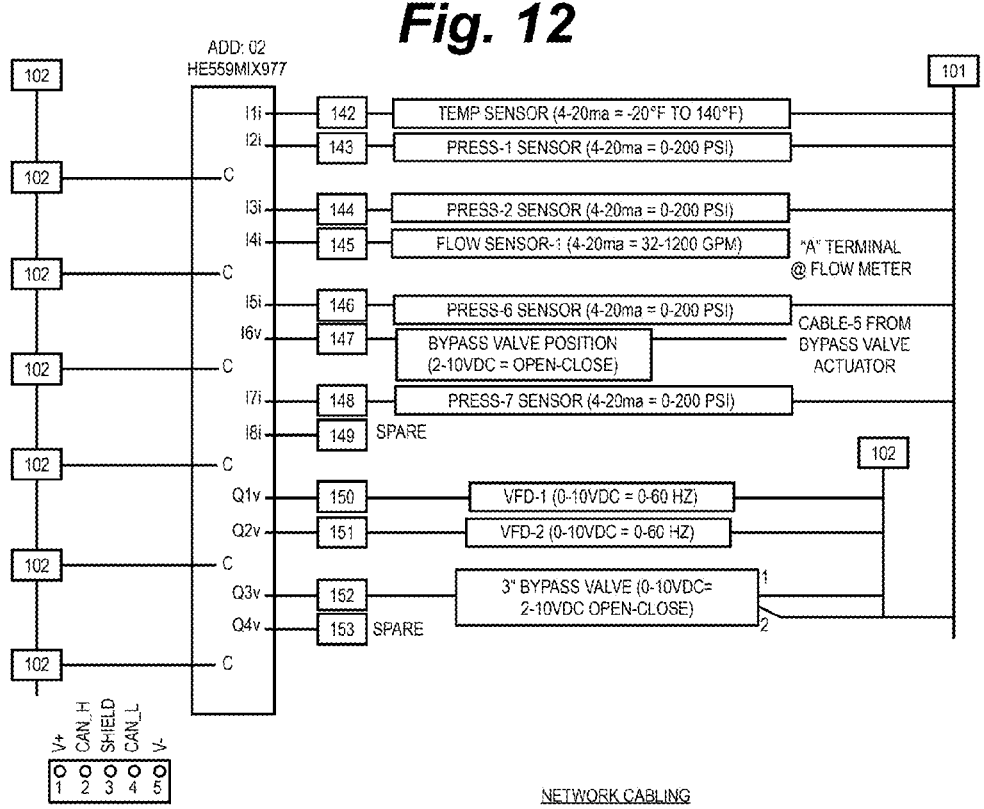
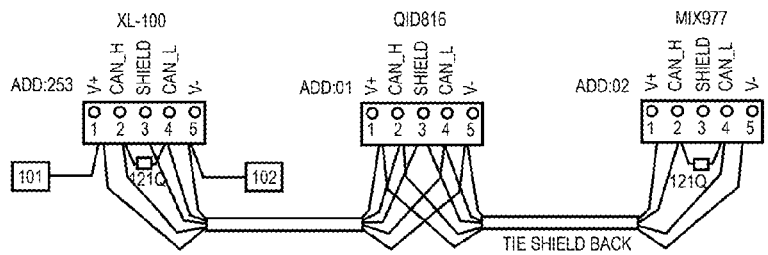
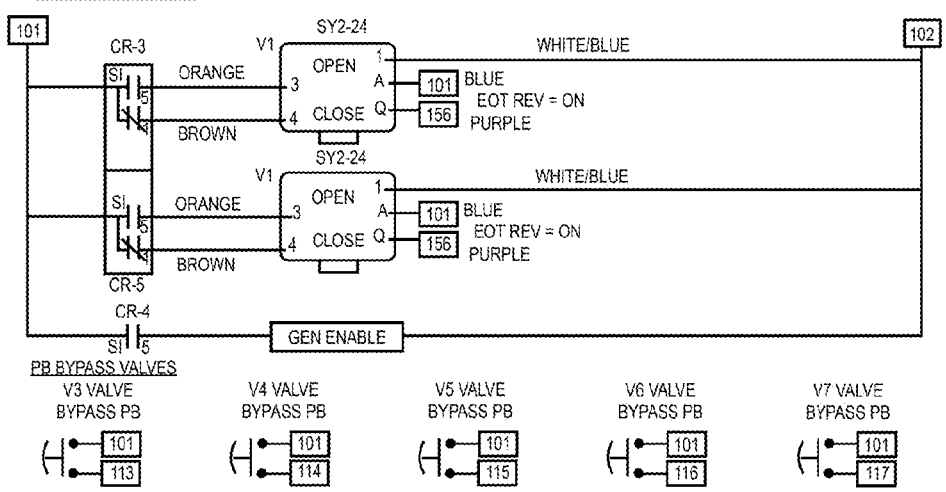

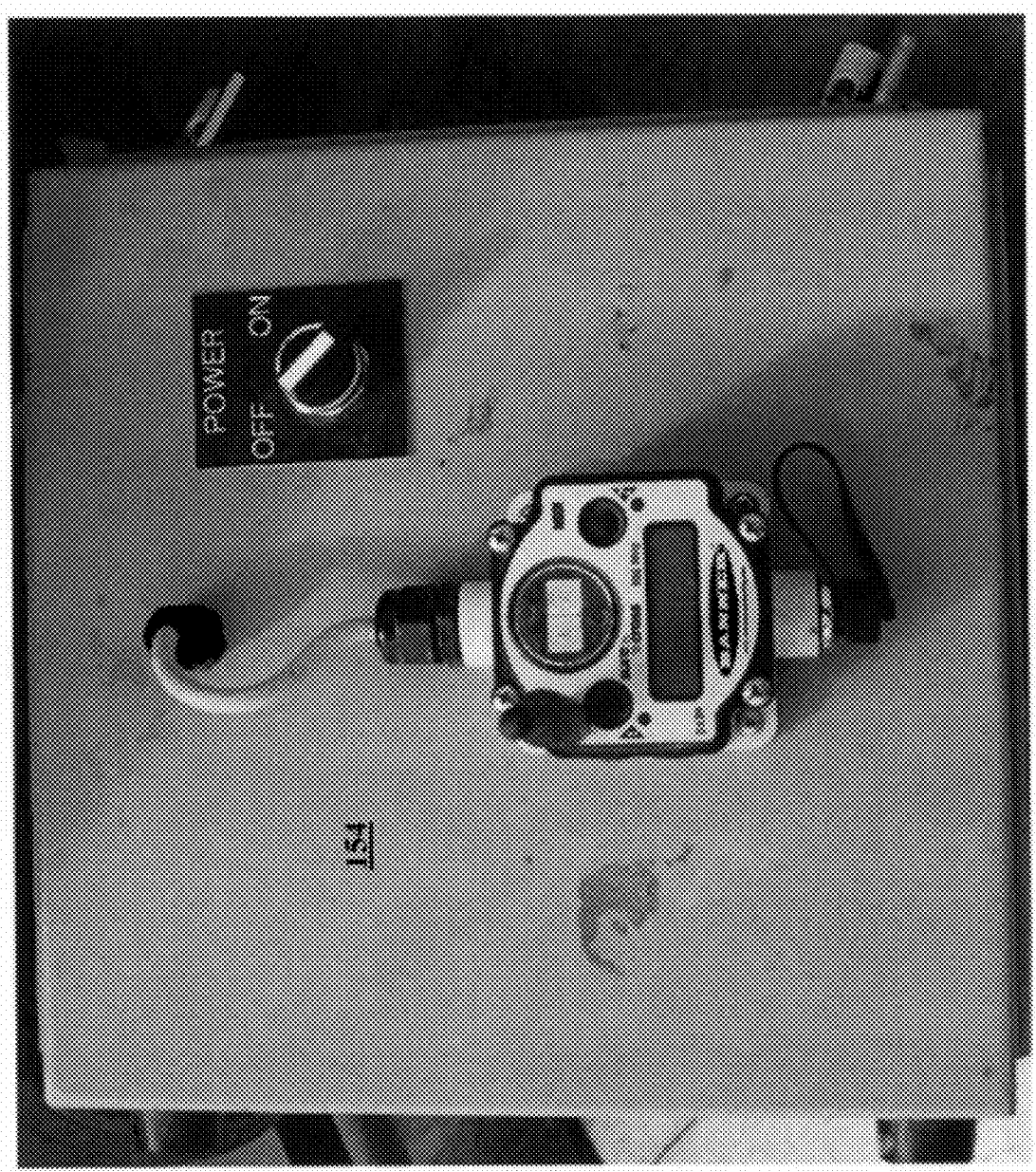

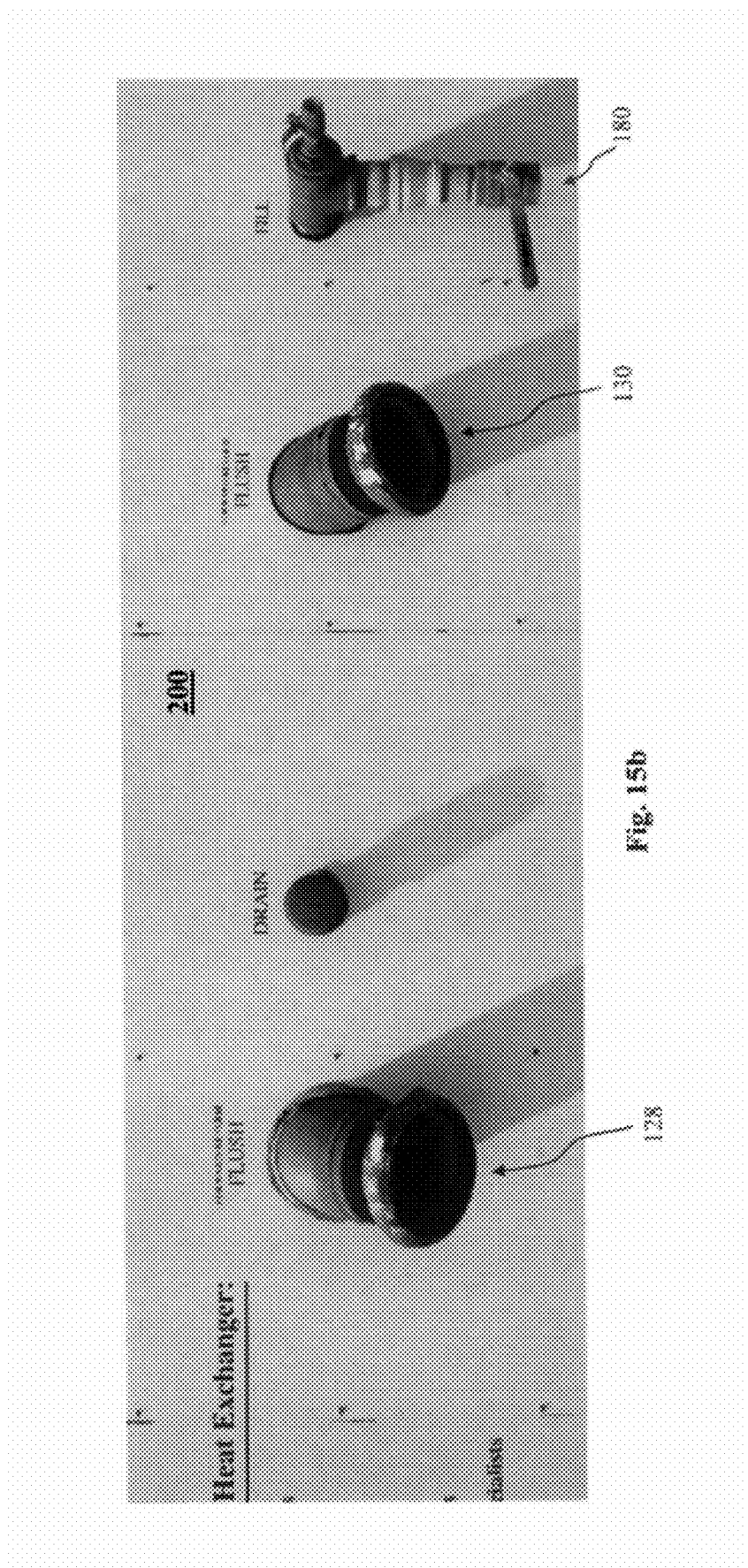

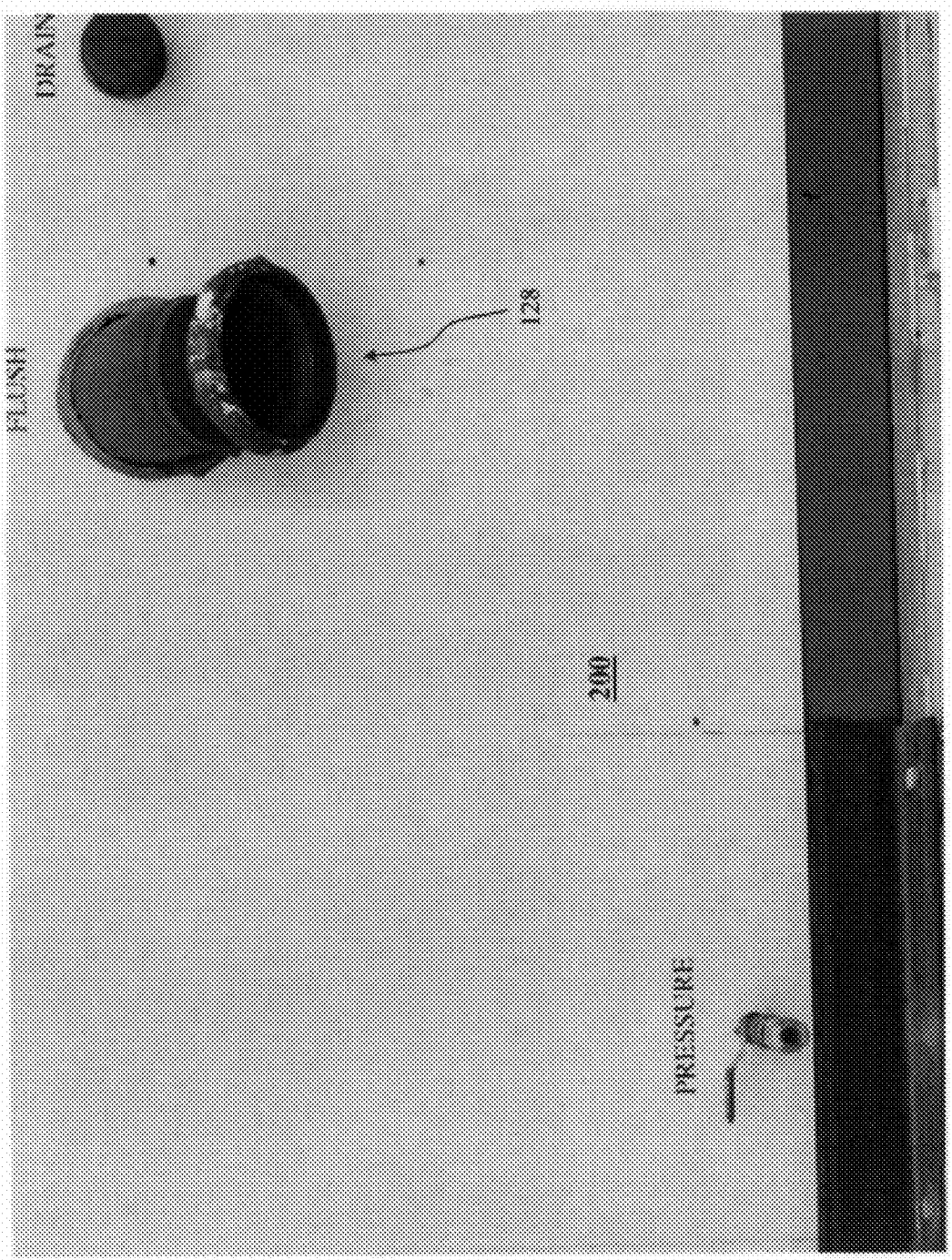

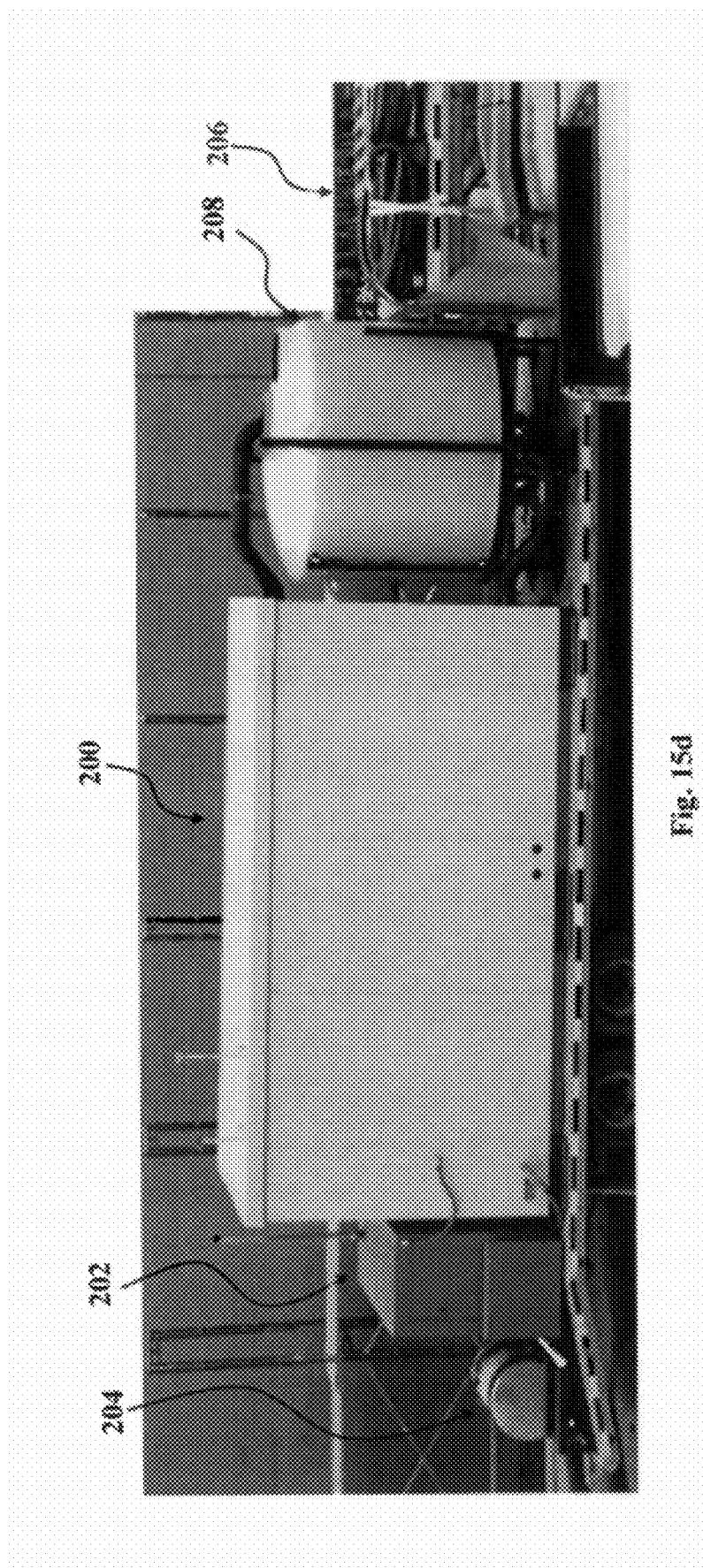

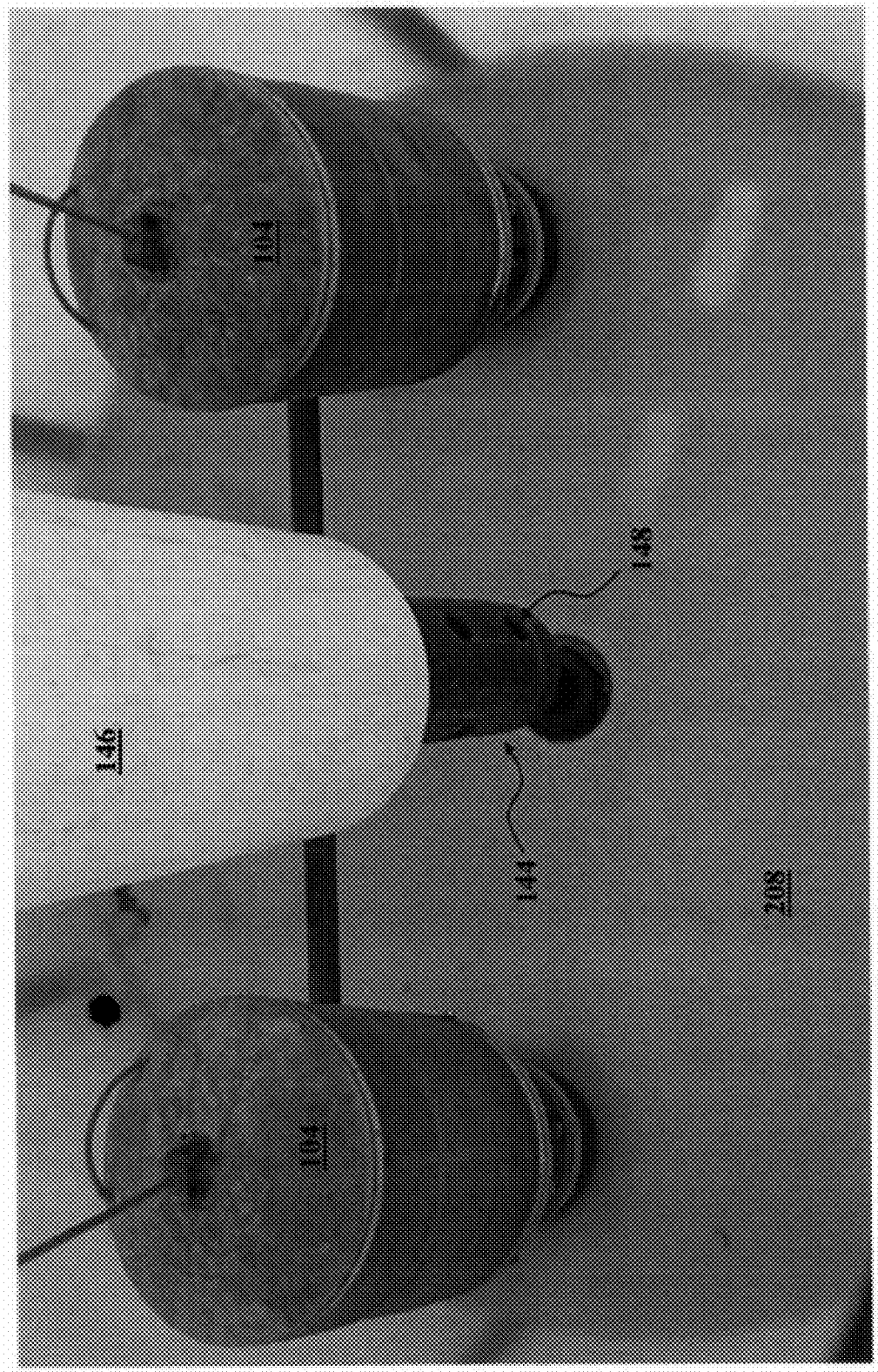

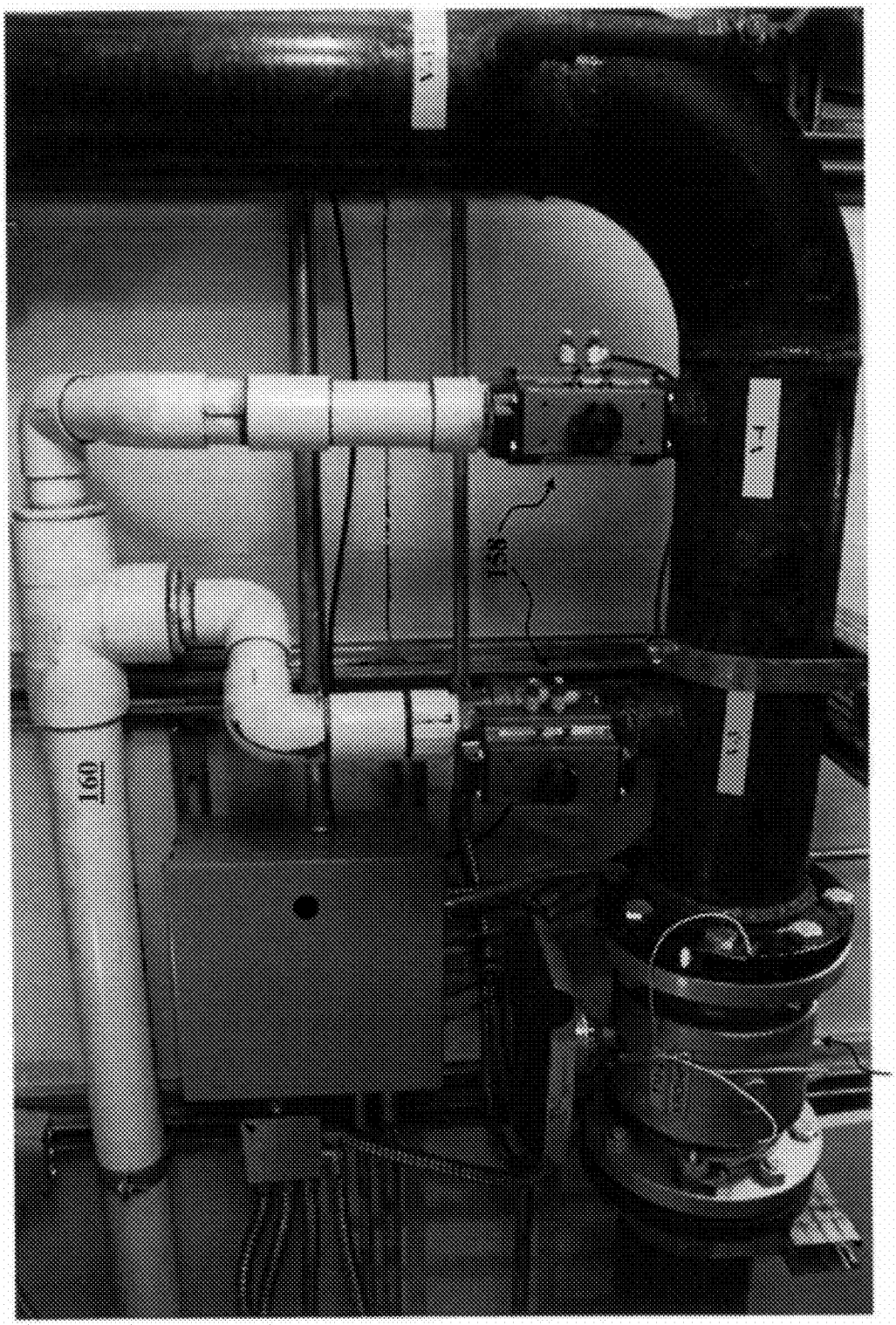

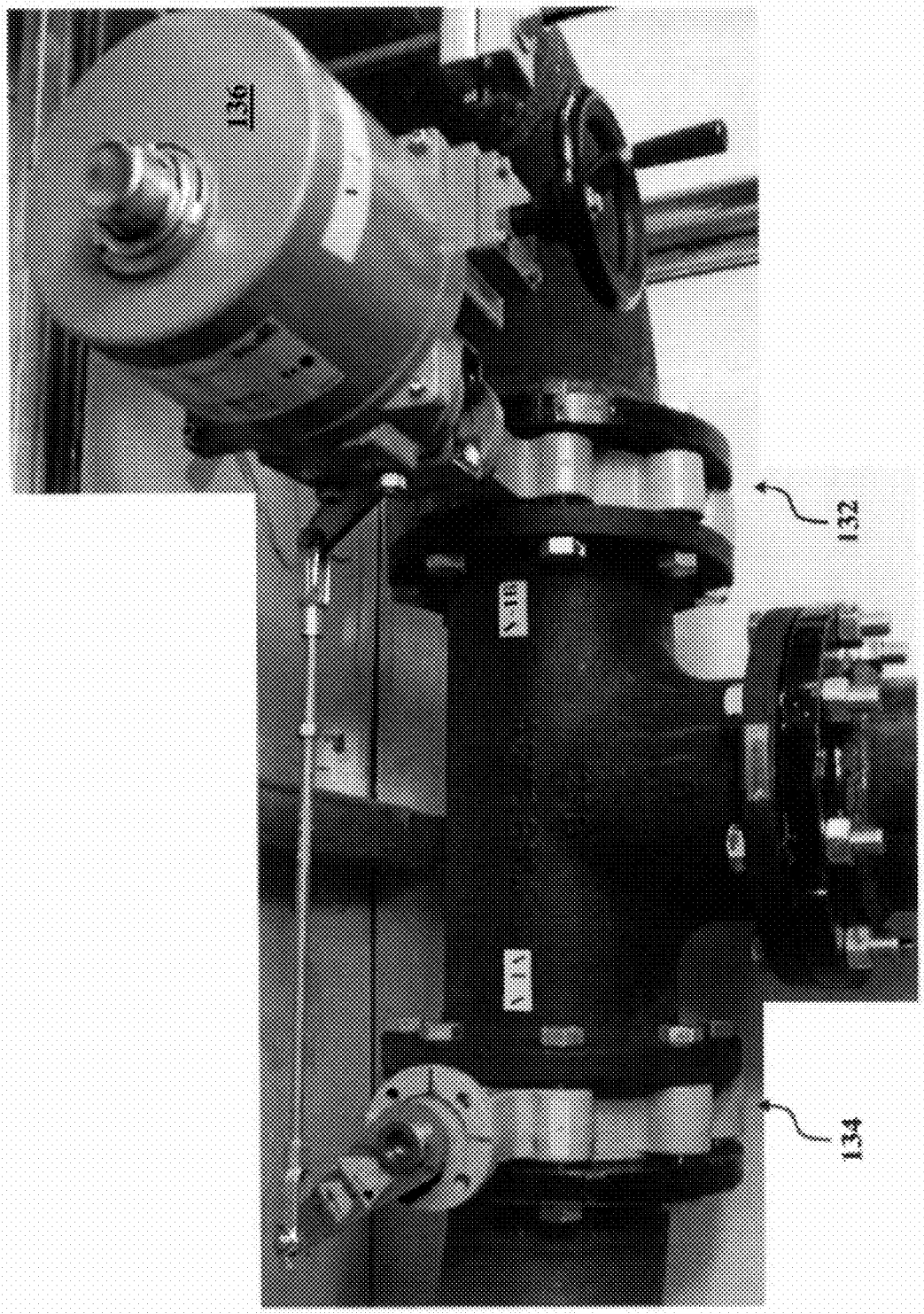

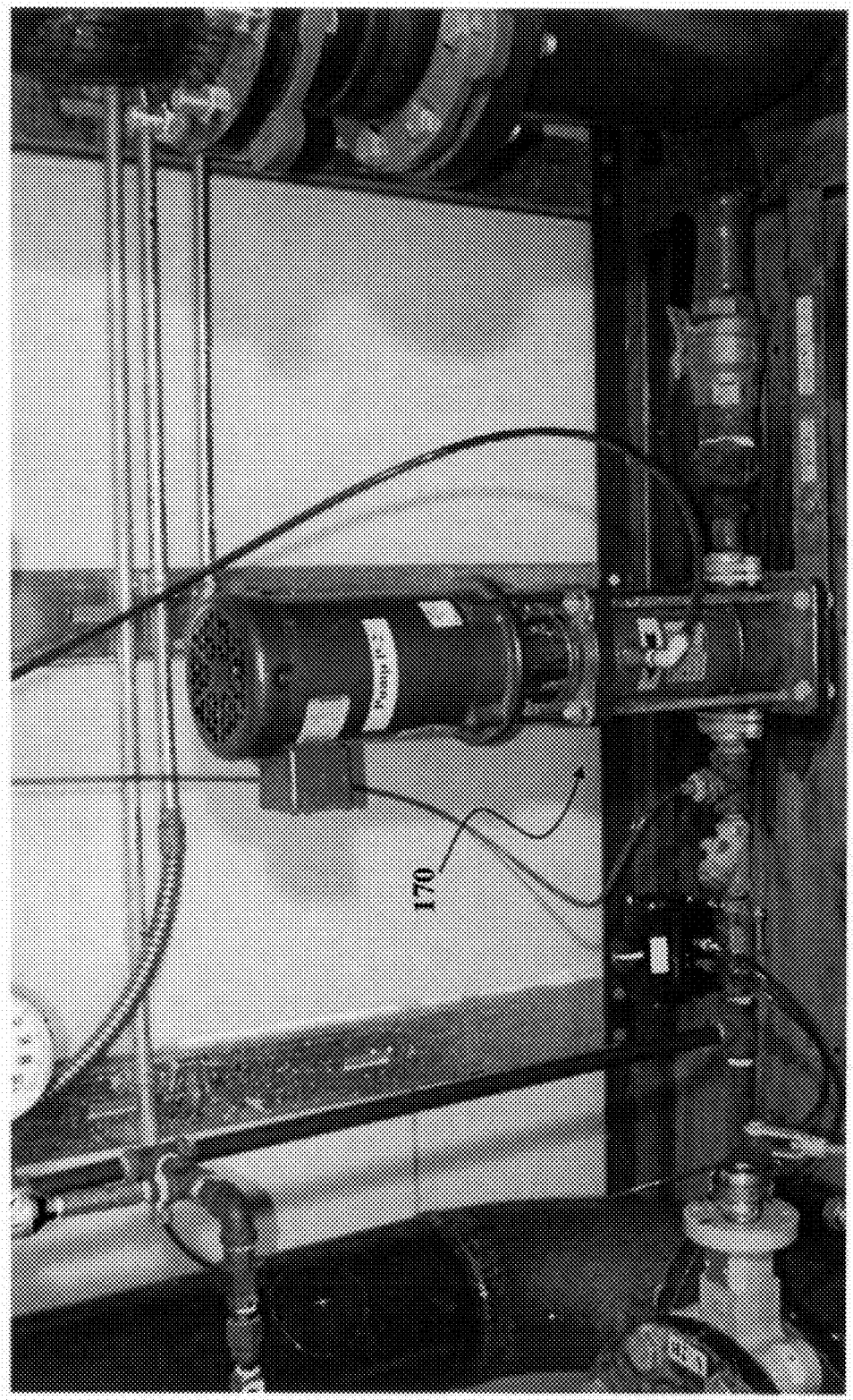

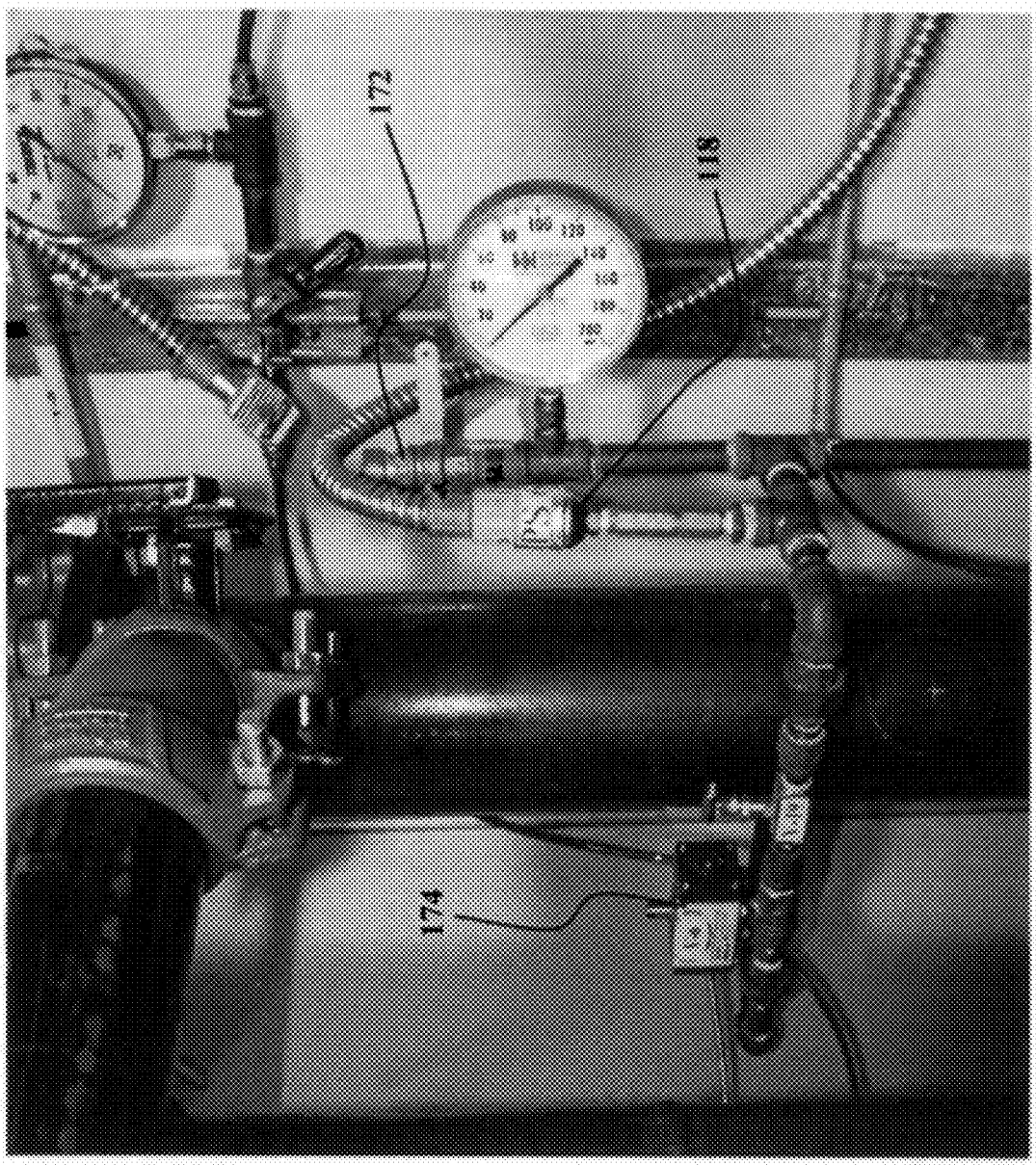

MOBILE HYDRO GEOTHERMAL TESTING SYSTEMS AND METHODS

RELATED APPLICATIONS

This application claims priority to U.S. Provisional Patent Application No. 61/371,539, filed Aug. 6, 2010, which is hereby incorporated by reference in its entirety.

FIELD OF THE INVENTION

The present invention relates to the construction of geothermal heat pump based heating and cooling systems, and more particularly to systems and methods involved with the installation, preparation, flushing, filling, testing, and certification of such systems with a portable pumping and testing apparatus.

BACKGROUND OF THE INVENTION

Geothermal heat pump based heating and cooling systems (Geothermal Systems) have been in use for over 30 years, but have recently realized dramatic increases in popularity. In general, a Geothermal System is comprised of three main parts: a ground heat exchanger (GHX), a heat pump or system of heat pumps, and a system of air handling and distribution devices. The heat pumps and air handling or distribution devices are located inside a building to be conditioned, while the GHX is located, as one would expect, outside of the building. Generally, the GHX itself comprises long lengths of polyethylene piping buried in the ground, and the distribution piping connecting the GHX to the heat pumps.

In operation during heating months, closed loop Geothermal Systems enable absorption and transfer of heat from the ground to the heat pump(s) via a heat transfer fluid (Fluid). The heat pumps extract heat from the Fluid for delivery to the building, reducing the Fluid's temperature by several degrees. The Fluid is then transferred back to the ground to repeat the process. In cooling, the process is essentially reversed as the heat pump extracts heat and humidity from the air inside the building, injects it into the Fluid, increasing the Fluid's temperature by several degrees, and then transfers the heat back to the ground by pumping the Fluid through the GHX. After the heat is rejected to the ground, and the Fluid temperature reduced, the Fluid is then circulated back to the building's heat pumps to repeat the process.

To enable the heat absorption and rejection from the ground miles of piping may need to be buried in order to transfer enough heat to or from the building. The greater the size of the building, the more pipe must be installed in the ground for the system to be effective. This network of buried piping is referred to as a ground heat exchanger or GHX. To minimize the energy required to circulate the Fluid within the closed loop the piping is often installed in parallel configurations. I.e., the total Fluid flow required to properly operate the Geothermal System is typically divided among many circuits of buried closed-loop piping as opposed to a single continuous loop. These parallel circuits are often coupled together at a manifold in or near the building. The heat transfer characteristics of the system are dependent on achieving a desired Fluid flow rate, thermal capacity, and fluid pressure within all circuits of the GHX and the associated distribution piping.

The reliability and dependability of the Geothermal System, and its ability to provide desired comfort for the building's inhabitants, is highly sensitive to unrestricted Fluid flow, accessibility of all of the piping circulation circuits of the GHX, and the consistency of overall system pressure. It is therefore desirable that proper preparation of the GHX be performed to control these elements.

If a GHX is not properly prepared for service, the following undesirable conditions are probable:

Air introduced into the closed system during installation will likely remain entrapped. This condition can cause portions of the GHX to simply "lock out," forcing the Fluid to circulate along an easier path within the parallel circuitry. This reduces accessibility of desirable heat absorption and rejection capacity, perhaps for the life of the system.

Debris, such as earthen materials, plastic pieces, etc., introduced into the system during installation can be entrained in the Fluid, travelling to straining devices inside the building which serve to protect heat pumps and other sensitive equipment. This debris accumulates, gradually restricting Fluid flow and reducing heat pump capacity to the point of possible failure. This condition is highly undesirable as the removal of the accumulated debris is difficult, requiring the isolation of Fluid flow to the affected device, disassembly of the piping, and likely introduction of undesirable air to the closed system.

GHX leaks, and associated loss in pressure within the closed system of piping, can cause a multitude of problems including, circulating pump cavitation, contamination of the Fluid, and release of Fluid to the environment and, if left untreated, total System failure.

Accordingly, the performance of the entire Geothermal System relies on the physical integrity of the piping comprising the ground heat exchanger and related distribution piping. Furthermore, the removal of entrapped air and entrained debris from the closed loop system of piping, to the extent possible, are related to the physical integrity and energy efficiency of the system.

Current systems for testing typically utilize a gas/diesel powered pumps and simple manual valving and visual observations of pressure meters to provide flushing and pressurization for testing. Such systems lack records for verification, lack automation for precise control of the systems, lack controls to prevent pressure surges and damage to equipment and piping.

DESCRIPTION OF RELATED ART

Various geothermal heat exchangers and related methods are disclosed in U.S. Pat. Nos. 5,244,037, 6,138,744 and 7,263,873, and U.S. Publication No. 2009/0165992, each of which is hereby incorporated by reference, excluding claims and specific definitions.

SUMMARY OF THE INVENTION

A mobile, self-contained, electrically operated, filtration, air-removal, and hydrostatic testing apparatus for flushing, cleaning and preparing heat transfer fluids used in building heating/cooling systems.

One embodiment of the invention can remove earthen materials, plastic shavings, or other debris (i.e., filtration) and trapped air (i.e., purging) from closed-loop piping systems. A portion of the piping system typically has been buried in the earth, and a portion constructed within a pipe vault or building, the combination of which comprise a Geothermal Piping System. The debris is removed by forcing a high-volume of liquid through the piping system in one direction and then automatically reversing the flow direction of the liquid in a controlled to dislodge debris or trapped air without damage to the piping system.

One embodiment of the invention includes a variable frequency drive coupled to an electrically driven pump capable of generating a fluid flow of at least ten gallons per minute (GPM) with sufficient force to generate at least two feet per second of fluid flow velocity through a piping system without introducing an overpressure condition in the piping system.

One embodiment of the invention includes a continuous back-flushing device to remove debris from the Fluid or filters while maintaining a fluid velocity through a piping system.

One embodiment of the invention can hydrostatically leak-test a Geothermal Piping System according to ASTM F2164-02, *Standard Practice for Field Leak Testing of Polyethylene Piping Systems using Hydrostatic Pressure*. ASTM F2164-02 prescribes the procedures to effectively discern the presence of a system leak through the control of measurement variability caused by polyethylene (PE) pipe expansion while under pressure.

One embodiment of the invention includes an electrically driven pump configured to increase and hold (i.e., maintain) a hydrostatic pressure within a PE piping system by supplying additional liquid to the PE piping system in response to PE pipe expansion.

One embodiment of the invention can homogenize and prepare concentrated anti-freeze and chemicals with water, creating a heat transfer fluid (Fluid), and inject and pressurize the prepared Fluid into a Geothermal Piping System.

One embodiment of the invention includes a processor, coupled to at least one pump and at least one pressure monitor in fluid communication with a piping system, the processor being configured to monitor and control the fluid pumping and pressurization of a fluid in the piping system. One embodiment of the invention can include a wireless transmitter and receiver, coupled to a processor and at least one pressure sensor, such that pressure readings from the pressure sensor are transmitted wirelessly to the processor.

One embodiment of the invention includes a variable frequency drive coupled to a pump in fluid communication with the GHX. A controller operates the variable frequency drive provides control of the pump such that the pressure in the GHX can be accurately controlled and overpressure situations are avoided. Over pressure and water hammer are avoided by controlling the variable frequency drive such that a desired fluid flow is achieved over a period of time, thereby not introducing hydrostatic shock into the piping system.

One embodiment of the invention includes a method to maintain a relatively constant pressure in a PE piping system, despite the inherent property of PE pipe to expand in response to internal pressure. The method includes injecting a volume of liquid into the PE piping system sufficient to fill the system and achieve a desired setpoint pressure. The method further including maintaining the set point pressure by monitoring the pressure in the PE piping system and, in response to a drop in pressure below the setpoint, injecting additional liquid into the PE piping system to fill the expansion volume in the PE piping system such that the pressure setpoint is retained. Liquid can be injected into the PE piping system by controlling a fluid flow bypass coupled to a pressure pump, the pressure pump being in continuous operation and placed in, or removed from, fluid communication with the PE piping system by activation of the fluid flow bypass. In one embodiment a method of controlling a fluid flow bypass includes a processor configured to monitor a pressure sensor and activate the fluid flow bypass in response to a percentage deviation from a pressure setpoint.

One embodiment of the invention includes a plurality of valves coupling a pump supplying fluid to a piping system. The valves being physically coupled at a T-junction, such that the activation of one valve causes a first valve to close at the same rate that a second valve is opened, thereby diverting a fluid from a first path through the first valve to a second path through the second valve. The valves are both in fluid communication with the pump and the piping system, such that the activation of the first and second valves causes a fluid flowing through the piping system to reverse direction while preventing the occurrence of water hammer, or hydraulic shock, in the piping system, and without the need to reverse the operating direction of the pump.

One embodiment of the invention includes a flow velocity dissipation mechanism that can reduce air or gas entrainment in a fluid. The flow velocity dissipation mechanism can be fluidly coupled to a piping system such that as fluid is pumped into the piping system the fluid returning from the piping system passes through the velocity dissipation mechanism thereby reducing the presence of gas or air in the fluid as it is pumped back into the piping system. The flow velocity dissipation mechanism can include a pair of concentric pipes partially disposed in a fluid containment structure or tank, the inner pipe being capped at one end, receiving fluid from the piping system at the end opposite the cap, and including a plurality of openings formed in the inner pipe such that fluid is directed to the space between the concentric pipes. The outer pipe being open at both ends, such that when the velocity dissipation mechanism is oriented vertically air from fluid coming from the piping system can escape through the upper opening in the concentric pipes as the fluid drops into the containment structure.

One embodiment of the invention can record and log data received by a processor from sensors that can include, for example, pressure, pump speed, fluid flow rate, valve position setting and temperature, in order to document the various filtration, purging, testing, filling and pressurizing activities. The recorded data including the volume, rate, temperature, and pressure of the fluid(s) as they are delivered or received to and from the system. Pressure data can be remotely sensed at a location in the GHX piping system where the lowest fluid connection is available. The remote sensing can separately measure the pressure supplied by the piping apparatus and the resulting pressure in the piping system.

In an embodiment of the invention, a commissioning apparatus for a ground heat exchanger comprises a platform with a high volume pump having a pump input and a pump output and a pair of pump output valves connecting to the pump output, the input connecting to a water supply. The commissioning apparatus further comprising a first circulation port and a second circulation port, with one of the pair of pump output valves connected to the first circulation port and the other of the pair of pump output valves connected to the second circulation port, the pair of pump output valves operational in reverse fashion to each other whereby when one is open the other is closed and vice versa. The apparatus further having a return line to the water supply, the return line having a pair of return line valves with one connecting to the first circulation port and the other connecting to the second circulation port, the pair of return line valves operational in reverse fashion to each other whereby when one is open the other is closed and vice versa. The pair of pump output valves simultaneously operable with the pair of return line valves such that circulation flow exiting from one of the first and second circulation ports and returning to the other of the first and second circulation ports can be reversed. In an embodiment, the pair of pump valves and pair of return line valves may be controlled by a process controller to operate simultaneously.

In an embodiment of the invention, a commissioning apparatus for a ground heat exchanger comprises a platform with a high volume pump having a pump input and a pump output, the input connecting to a water supply. The commissioning apparatus further comprising a first circulation port and a second circulation port. And wherein first circulation port and second circulation port are each switchable between connecting to the high volume pump output and to a return line to the water supply.

In an embodiment of the invention a commissioning apparatus has a shelter structure providing protection from the elements, the shelter structure containing an electric powered high volume pump, an electronically controlled valving portion, and a control processor with a human interface. The commissioning apparatus further comprising a water supply exterior of the shelter structure and circulation ports extending from shelter structure, the valving portion having valves electronically connecting to and controlled by the control processor and connecting to the water supply and to circulation ports, whereby the pumping of water from the water supply to a selected one of the circulation ports is controlled by the control processor.

In an embodiment of the invention, a commissioning apparatus for a ground heat exchanger comprises a platform with a high volume pump having a pump input and a pump output and a pair of pump output valves connecting to the pump output, the input connecting to a water supply. The commissioning apparatus further comprising a first circulation port and a second circulation port, with one of the pair of pump output valves connected to the first circulation port and the other of the pair of pump-output valves connected to the second circulation port, the pair of pump output valves operational in reverse fashion to each other whereby when one is open the other is closed and vice versa. The apparatus further having a return line to the water supply, the return line having a pair of return-line valves with one connecting to the first circulation port and the other connecting to the second circulation port, the pair of return-line valves operational in reverse fashion to each other whereby when one is open the other is closed and vice versa. The pair of pump output valves simultaneously operable with the pair of return-line valves such that circulation flow exiting from one of the first and second circulation ports and returning to the other of the first and second circulation ports can be reversed. In an embodiment, a process controller can operate the pair of pump valves and pair of return-line valves such that they are actuated simultaneously. In an embodiment of the invention the reversal of the flow is gradual taking at least 8 seconds, in another embodiment at least 15 seconds, in another embodiment at least 30 seconds.

In an embodiment of the invention, a commissioning apparatus for a ground heat exchanger comprises a platform with a high volume pump having a pump input and a pump output, the input connecting to a water supply. The commissioning apparatus further comprising a first circulation port and a second circulation port. And wherein first circulation port and second circulation port are each switchable between connecting to the high-volume pump output and to a return line to the water supply.

In an embodiment of the invention a commissioning apparatus has a shelter structure providing protection from the elements, the shelter structure containing an electric powered high volume pump, an electronically controlled valving portion, and a control processor with a human interface. The commissioning apparatus further comprising a water supply exterior of the shelter structure and a pair of circulation ports extending from shelter structure, the valving portion having valves electronically connecting to and controlled by the control processor and connecting to the water supply and to circulation ports, whereby the pumping of water from the water supply to a selected one of the circulation ports is controlled by the control processor.

In the above embodiments, such an embodiment may also have any of the following features:

- A return line connected to water supply and one of the circulation ports. The valving portion utilizing valves to switch the high volume pump output and the return line between each of the pair of circulation ports.
- A further high pressure pump connected to the water supply for injecting additional water at a controlled rate into the ground heat exchanger
- The water supply comprising a tank mounted on one of a trailer or a truck.
- A pressure sensor exterior of the shelter structure for monitoring the pressure in the ground heat exchanger and transmitting the pressure to the control processor for processing and varying the control of the valving portion.
- An electrical generator exterior of the shelter structure, the electrical generator connecting to the control processor.
- Portable piping stowed on the trailer or truck for connection to the ground heat exchanger and an external water source.

BRIEF DESCRIPTION OF THE DRAWINGS

FIG. 1a depicts a layout of a mobile commissioning apparatus according to an embodiment of the invention.

FIG. 1b depicts a block diagram of a testing system according to an embodiment of the invention.

FIG. 1d depicts a schematic diagram of a testing system according to an embodiment of the invention.

FIG. 3a depicts a partial top view of the purge unit piping of FIG. 2.

FIG. 3b depicts a partial top view of the purge unit piping of FIG. 2.

FIG. 4 depicts a side view of purge unit piping of FIG. 2.

FIGS. 9-13 depict schematic diagrams of a purging unit according to an embodiment of the invention.

FIG. 14a depicts a remote PT and transmitter exterior of an embodiment of the invention.

FIGS. 15a-15d depict external pictorial views of an apparatus according to an embodiment of the invention.

FIG. 16 depicts filtration and disentrainment/filter assemblies and velocity flow reduction mechanism disposed in an interior of a tank of an embodiment of the invention.

FIG. 17 depicts a flow meter and redundant pressure relief devices of an embodiment of the invention.

FIG. 19 depicts a second pair of reversing valves of an embodiment of the invention.

FIG. 20a depicts a pressure pump of an embodiment of the invention.

FIG. 20b depicts a pressure port coupled to the pressure pump of FIG. 20a.

DETAILED DESCRIPTION OF THE DRAWINGS

Figure 1C:
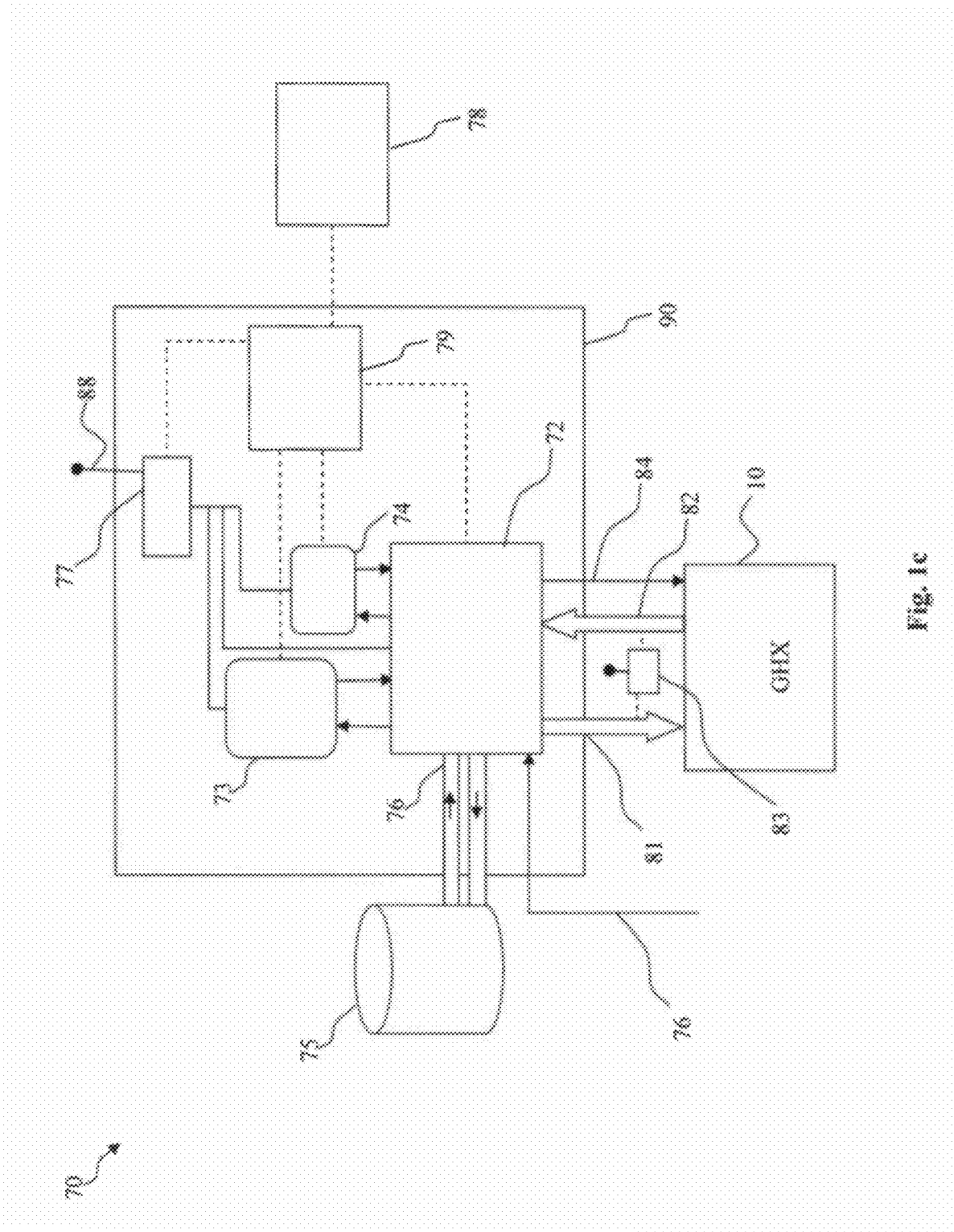
FIG. 1c depicts block diagrams of a commissioning apparatus according to an embodiment of the invention.
Figure 2:
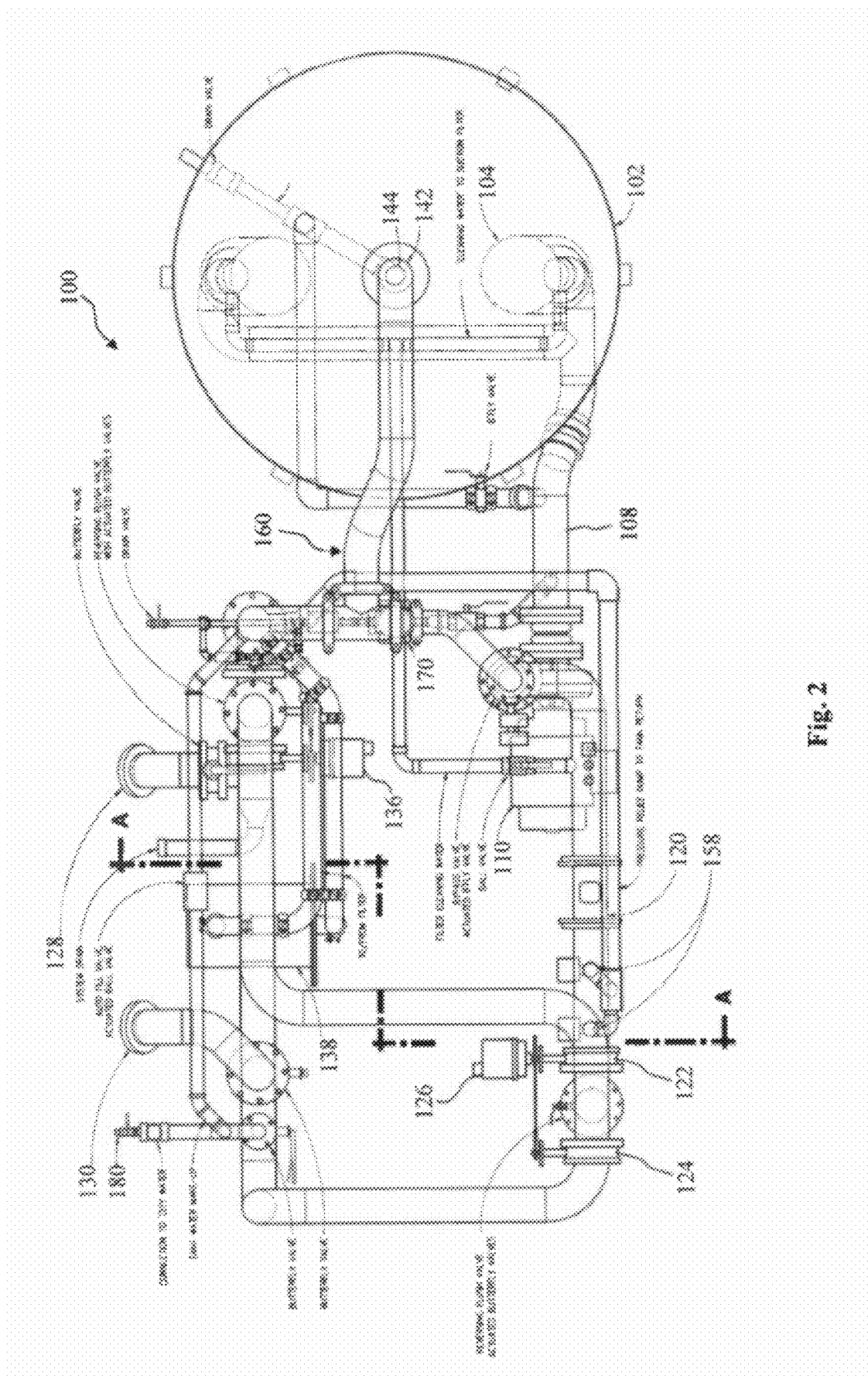
FIG. 2 depicts a top view of purge unit piping of FIG. 2.
Figure 5:
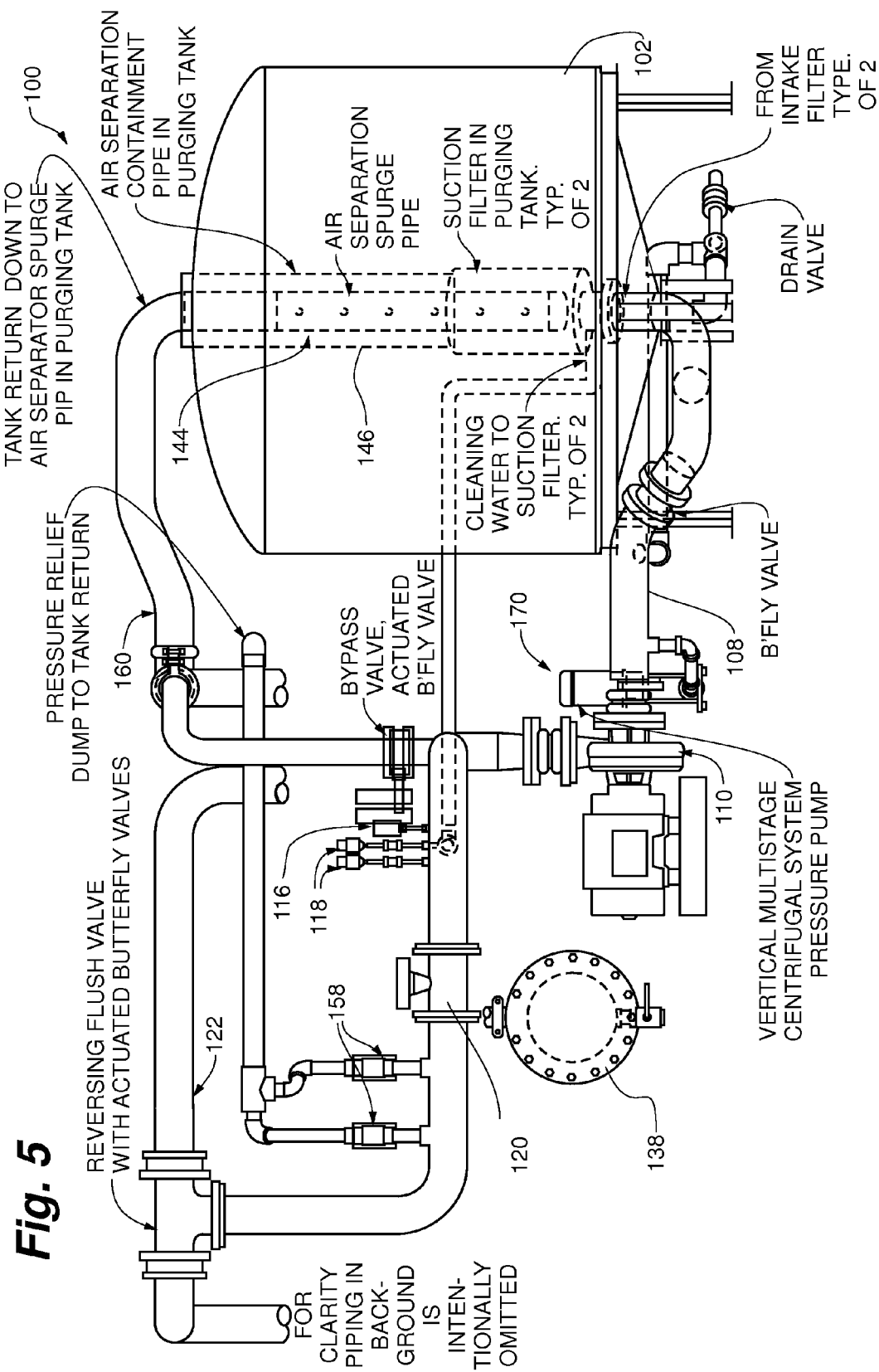
FIG. 5 depicts a side view of purge unit piping of FIG. 2.
Figure 6:
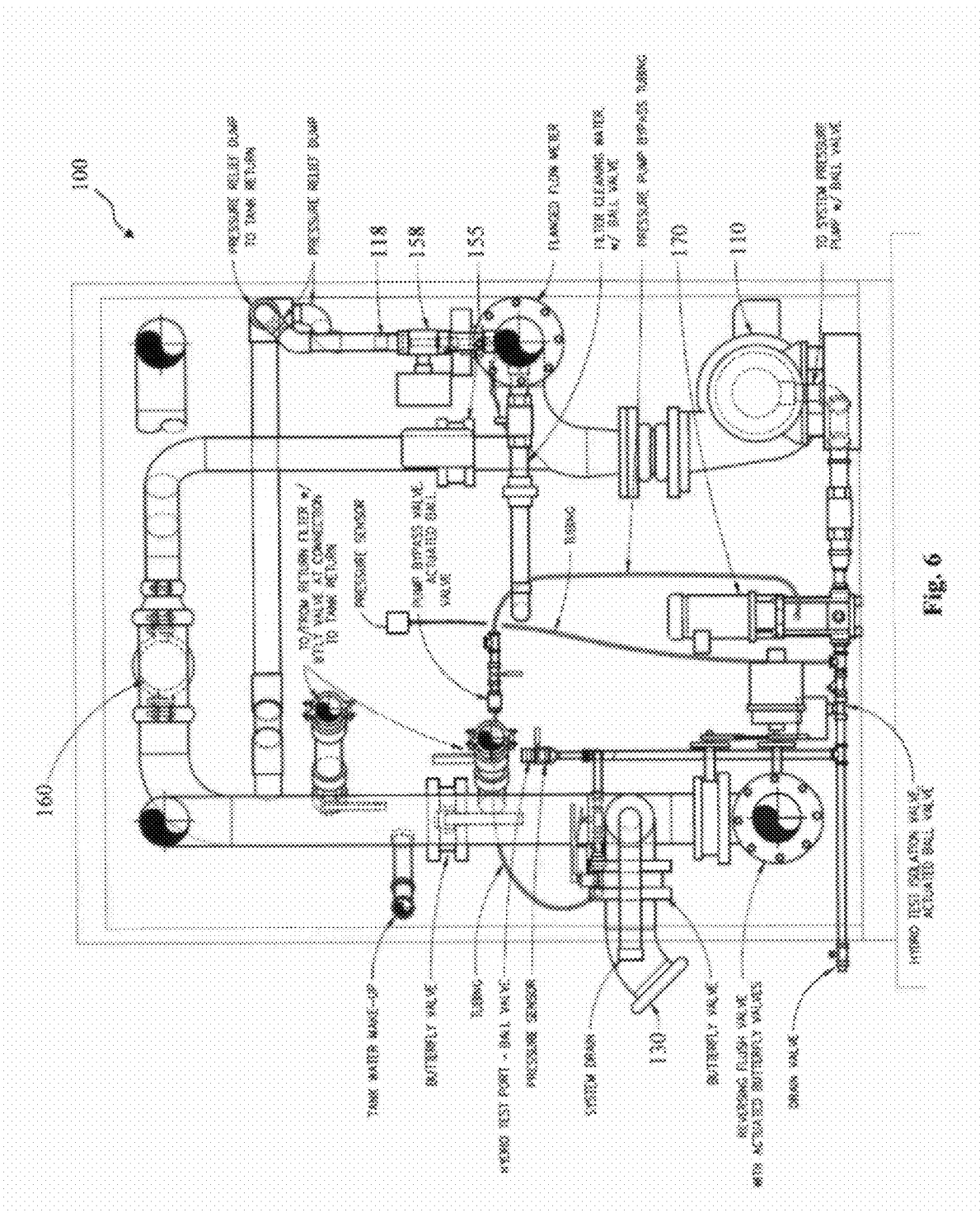
FIG. 6 depicts a sectional A-A view of purge unit piping of FIG. 2.
Figure 7:
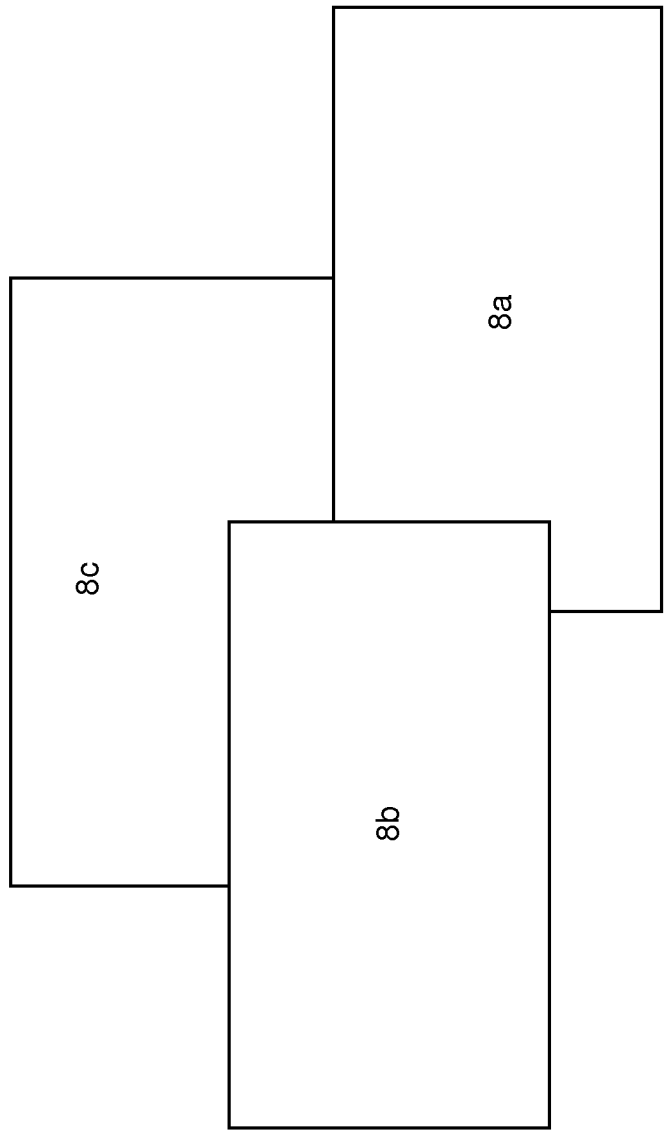
FIG. 7 depicts the layout of FIGS. 8a, 8b, 8b-1, and 8b2 which depict an isometric view of purge unit piping according to an embodiment of the invention.
Figure 8A:
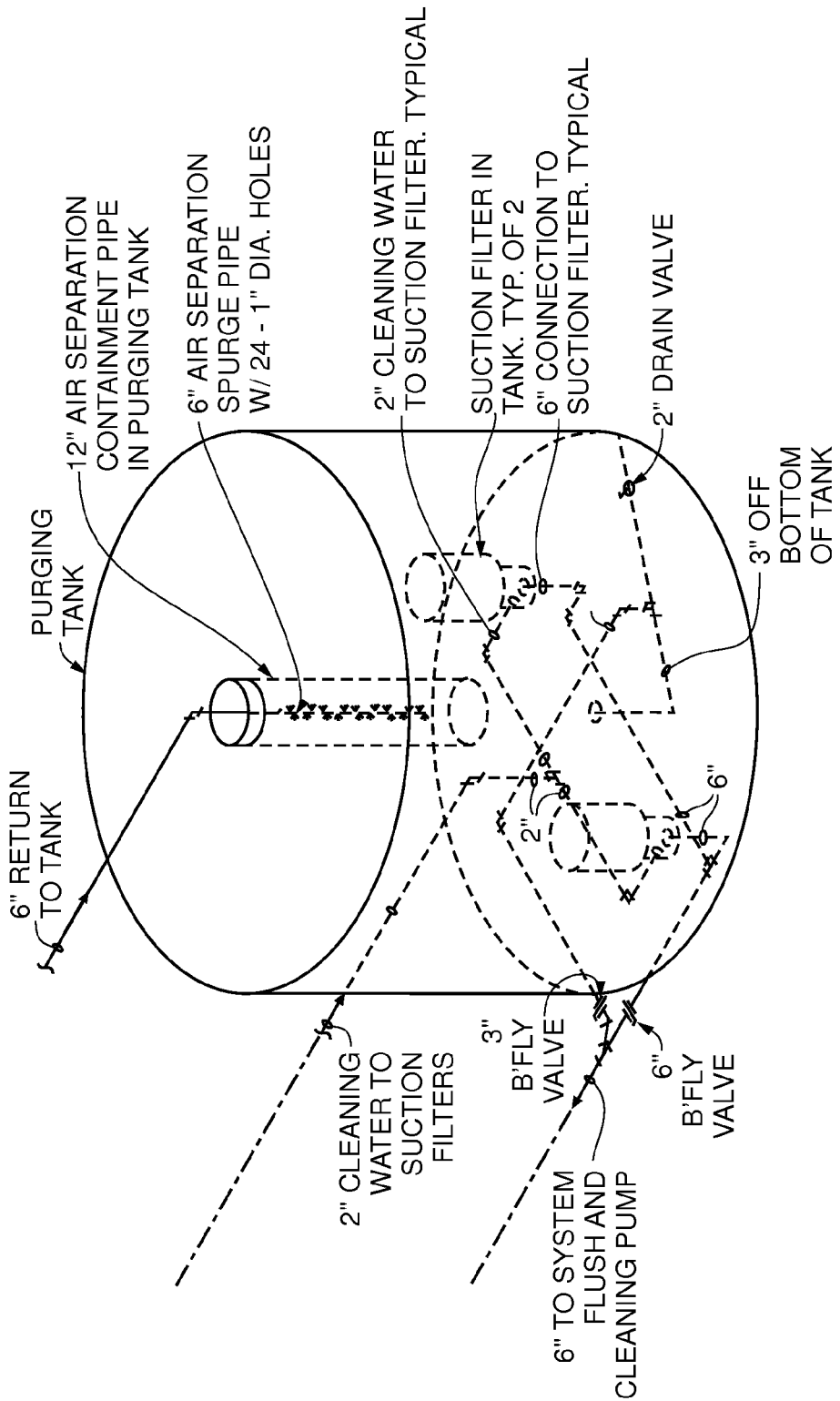
Figure 8B:
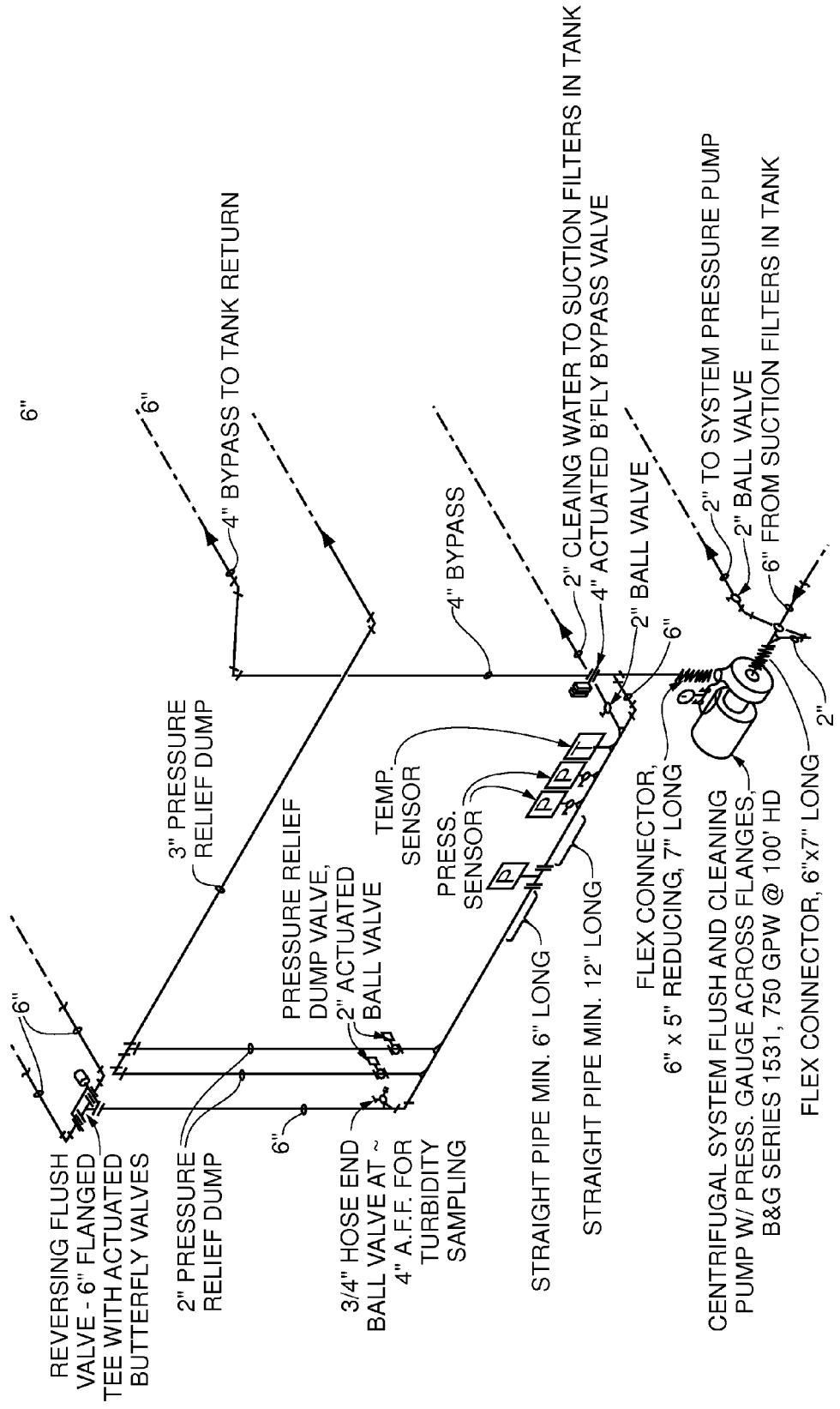
Figure 8C:
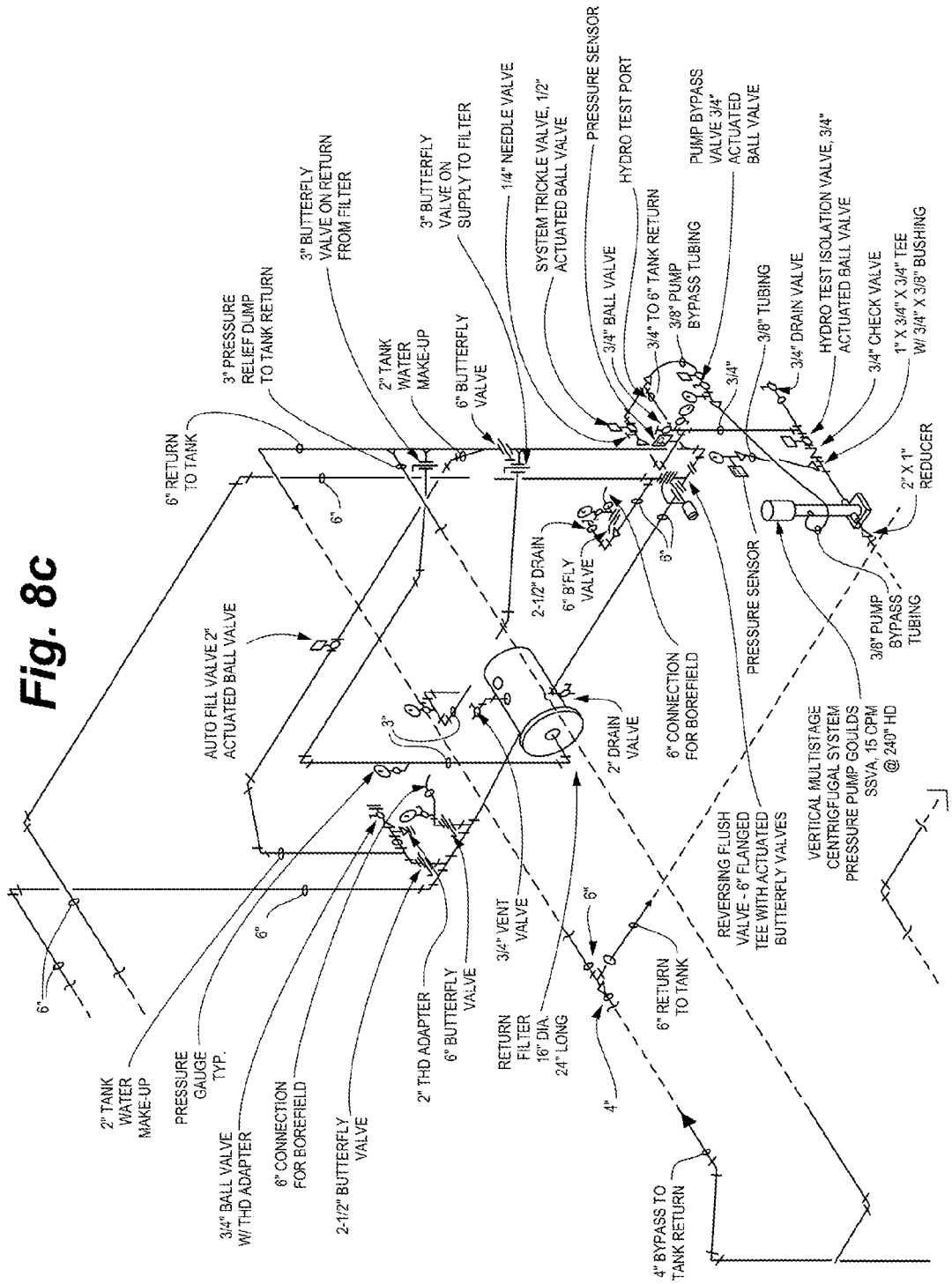
Figure 9:
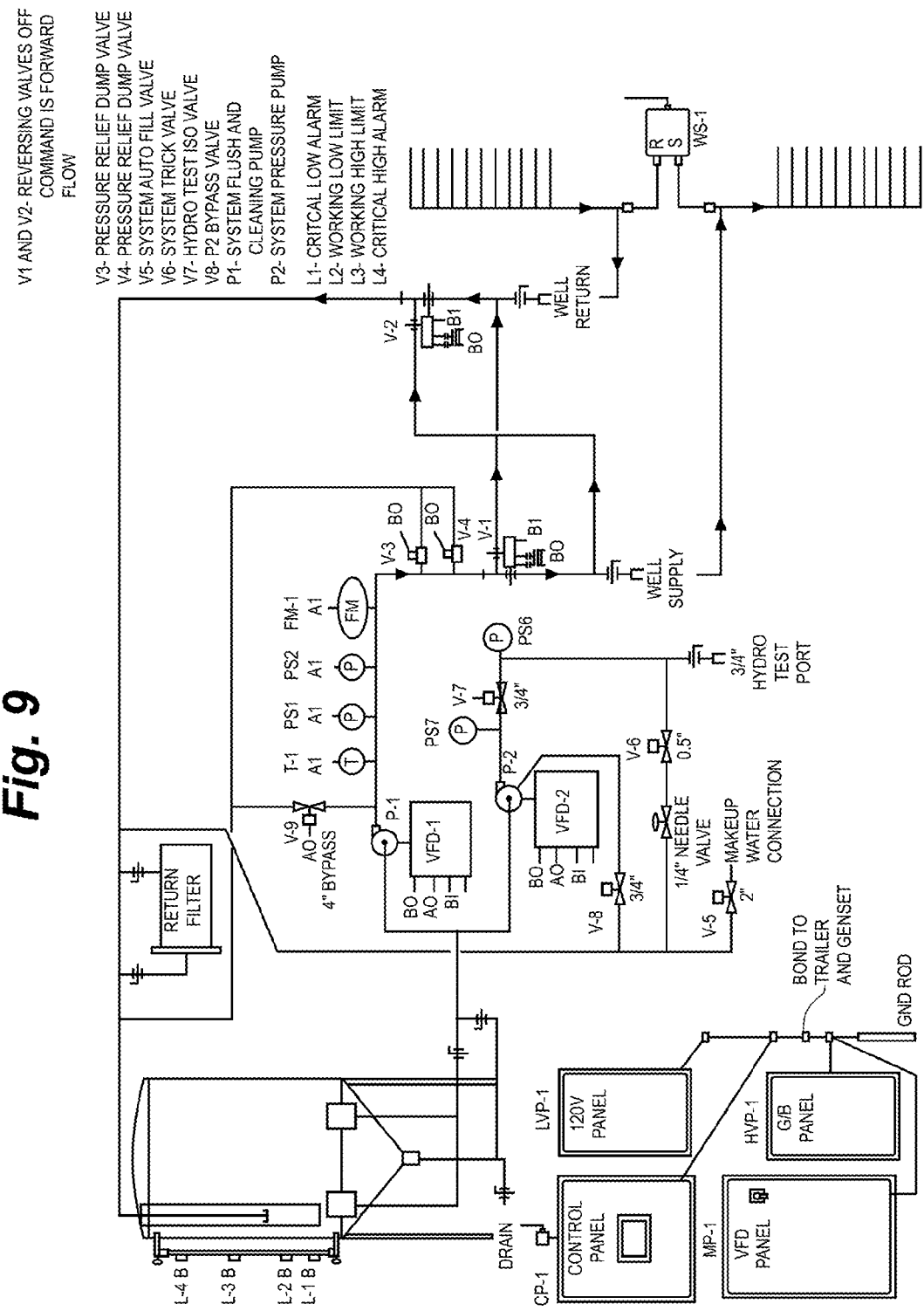
Figure 10:
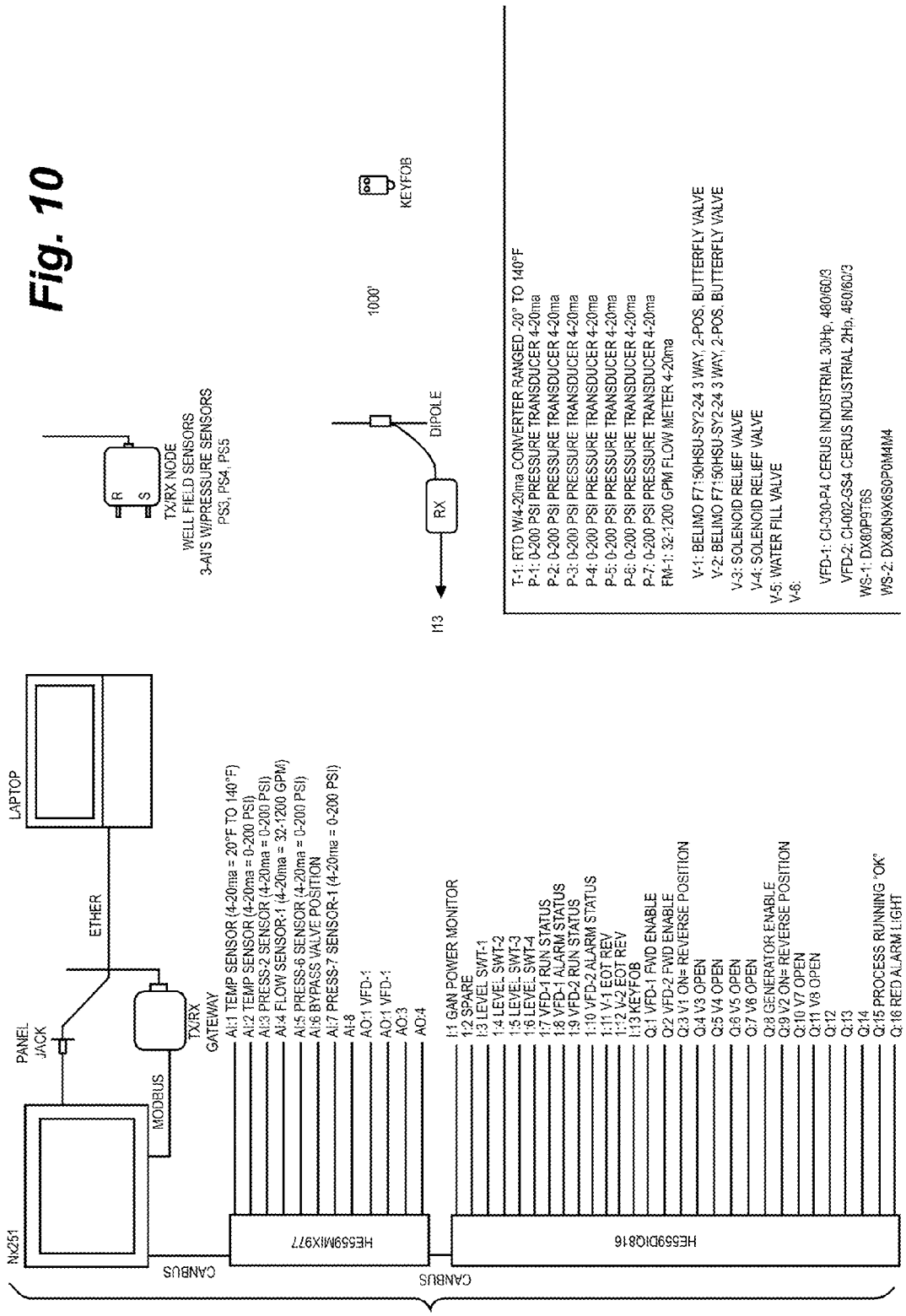
Figure 11:
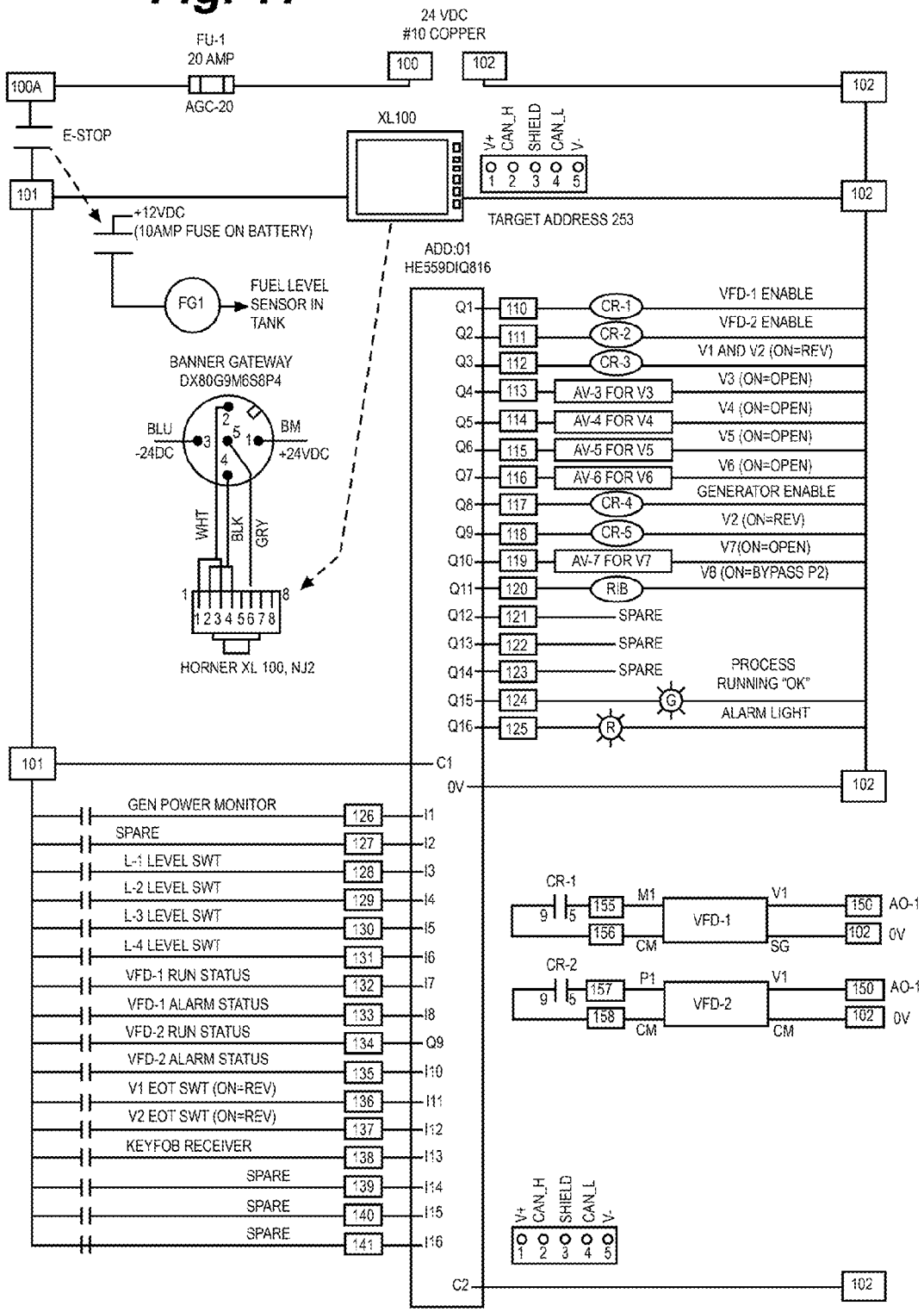
Figure 13:
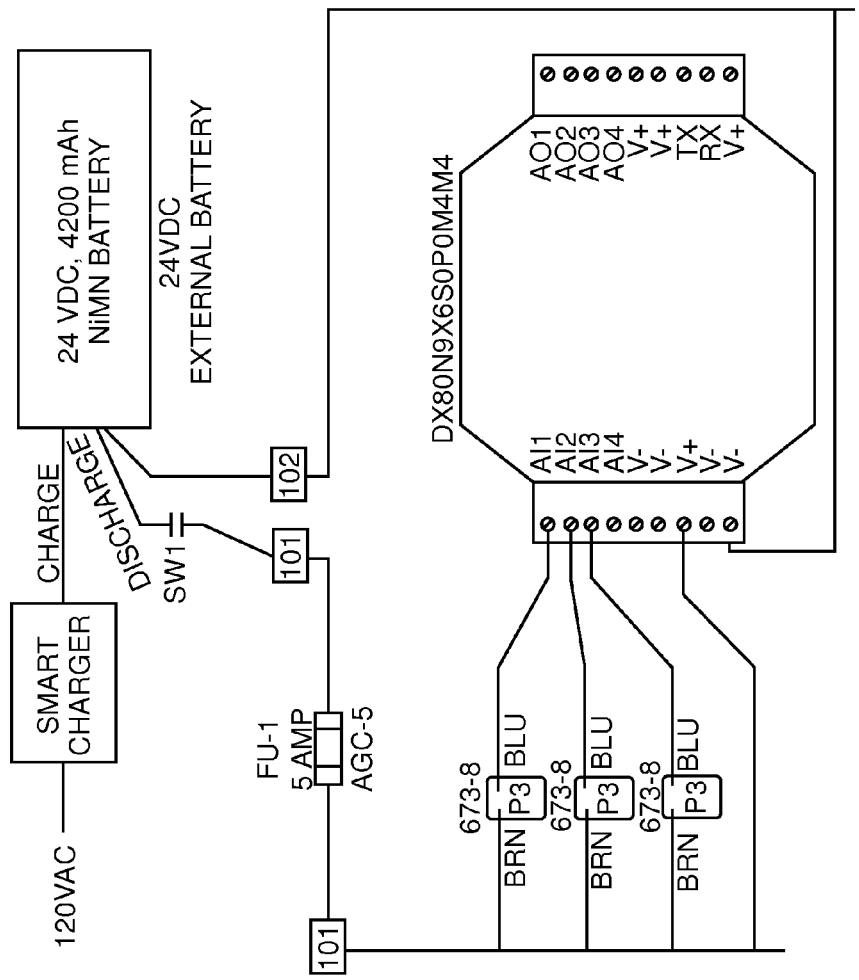

FIG. 1a depicts an exemplary embodiment of a commissioning apparatus 20 mounted on a vehicle trailer 22. The commissioning apparatus 20 includes a purge tank 24, an enclosed housing 26 and a power source such as a generator 28. Mounted within the enclosed housing 26 are a programmable controller 30, a high-volume pumping apparatus 32 and a high-pressure pumping apparatus 34. The high-volume pumping apparatus 32 and the high pressure pumping apparatus 34 are in fluid communication with the purge tank 24 and an external water source that is coupled to the enclosed housing through a water intake port 35.

The high-volume pumping apparatus 32 can include a high-pressure pump, and a system of reversing valves that are coupled to a pair of circulation ports 36, 37. The circulation ports 36, 37 can be coupled to a geothermal heat exchange (GHX) system such that a high volume of fluid can be pumped in either direction through a GHX circuit. The fluid is also circulated through the purge tank 24, thereby allowing air or gas to escape the GHX circuit.

The high pressure pumping apparatus 34 includes a high-pressure port 38 that can be coupled to a GHX circuit to conduct pressure testing of the circuit. The programmable controller 30 can operate and monitor both the high-volume pumping apparatus 32 and the high pressure pumping apparatus 34.

FIG. 1b depicts an exemplary flow diagram of liquid through a combined flushing and pressurization testing apparatus 50. A high-volume pumping apparatus 52 includes reversible ports 54 and 56 that can be coupled to a GHX system such that a high-volume flow can be directed through the GHX system in a forward or reverse direction without requiring the apparatus 50 to be disconnected from the GHX system. The high-pressure pumping apparatus 60 includes a high-pressure port 62 that can be coupled to the GHX system such that a high-pressure flow can be directed into the GHX system to maintain and monitor the GHX system during a pressurization test to determine the integrity of the GHX system. Both the high-pressure pumping apparatus 60 and the high-volume pumping apparatus 52 can be in fluid communication with a reservoir 55 via a supply conduit 58 and a return conduit 64. Additional make up water, or another fluid, can be introduced into a reservoir 55 from an external intake 65 when the fluid level in the reservoir falls below a desired operating level. The operation and monitoring of both the high-pressure pumping apparatus 60 and the high-volume pumping apparatus 52 can be achieved with a programmable controller 66 that is electrically controlling and monitoring the valves, pumps, and sensors in the apparatus 50.

FIG. 1c depicts an exemplary commissioning apparatus 70 coupled to a GHX system 10. The apparatus 70 can include: a valving system 72, a high-volume pumping apparatus 73, a high pressure pumping apparatus 74, a fluid tank 75 in communication with the valving system 72 through a series of conduits 76. The valving system 72, high-volume pumping apparatus 73, and high pressure pumping apparatus 74 can be controlled by a programmable control unit 77; all of which can be housed in a shelter structure 90. Power can be supplied to the apparatus 70 by a generator 78 via a power distribution panel 79 that can include circuit breakers and appropriate wiring.

The apparatus 70 can be coupled to the GHX system 10 with a high-volume output 81 and a high-volume return 82. The flow direction through the high-volume output 81 and the high-volume return 82 can be reversed by manipulation of the valving system 72. Pressure in the GHX system 10 can be monitored by a pressure sensor assembly 83 coupled to the high-volume output 81 and a high-volume return 82. The pressure sensor assembly 83 can be in wireless electronic communication through the use of a Wi-Fi radio connection or other available wireless communication transceiver or protocol system. The shelter structure can include an antenna 88 to allow for the pressure sensor assembly 83 to be positioned remotely from the apparatus 70 at a point closes to the GHX 10. A high-pressure port 84 can also be utilized independently or in combination with the high-volume output 81 and the high-volume return 82.

FIG. 1d depicts an exemplary embodiment of a combined flushing and pressurization apparatus 100 coupled to a plurality of buried heat exchange loops which form a GHX system 10. Along with a control management system, the apparatus 100 includes two basic circuits, a flushing circuit and a leak testing. The major components of the flushing circuit are a main circulating pump 110, an open atmospheric tank or reservoir 102 with filtration devices 104, and a set of flow redirection valves (122, 124, 132, 134) and bypass devices 158. The leak testing circuit includes a pressure pump 170 and flow control and bypass devices 174. These two circuits can also be utilized to provide heat transfer fluid mixing and injection.

In an exemplary GHX system 10, the supply manifold 12 is coupled to the intake line of each exchange loop 14 which may extend for hundreds of feet underground and then terminate at return manifold 16. The supply manifold 12 and return manifold 16 include fluid couplings or ports that allow the apparatus 100 to be placed in fluid communication with the GHX system 10.

Flush/Purge Circuit

The flushing and pressurization apparatus 100 includes a fluid reservoir 102 that includes a pair of intake filters 104 that are disposed near the bottom of the reservoir 102. Intake filters 104 can comprise 30-mesh basket strainers in an example embodiment. Intake filters 104 can include a continuous back-flushing device to remove debris from the strainers or other filter medium. Intake filters 104 are coupled to an output 106 that can be utilized to draw a liquid from the fluid reservoir 102. The output 106 can be coupled through a supply line 108 to a pump 110.

Pump 110 can be an electrically driven high-volume fluid pump controlled by a variable frequency drive (VFD) 112. The VFD 112 allows the pump 110 to transition from an low initial flow rate to a desired flow rate over a period of time, thereby reducing or eliminating the chance of an over pressure or water hammer condition from damaging the GHX system 10. Pump 110 can be of various sizes depending on the volume of the GHX system 10. In one embodiment the pump 110 is capable of generating a fluid flow of at least ten gallons per minute (GPM). In one embodiment the pump 110 is capable of generating a fluid flow of at least 750 GPM. Other fluid flow rates are also contemplated.

Pump 110 is coupled to a pump output-line 114 that can include a variety of sensors to monitor the performance of the pump 110 as well as the fluid being pumped into the GHX system 10. The sensors can include a temperature sensor 116, one or more pressure sensors 118, and a fluid flow meter 120. The sensors can include either an analog or digital display, or be configured to provide an electronic signal containing the sensed value.

The pump output-line 114 is coupled to a first supply valve 122 and a second supply valve 124 at a T-joint. The first supply valve 122 and the second supply valve 124 are both coupled to, and actuated by, a single supply-valve actuator 126. The first supply valve 122 and second supply valve 124 are both coupled to the supply-valve actuator 126 and configured such that if the first supply valve 122 is fully open the second supply valve 124 is fully closed. Likewise, when the second supply valve 124 is fully open the first supply valve 122 is fully closed. When the supply valves transition from open to closed and closed to open the supply-valve actuator 126 operates on each valve simultaneously such that the pair of valves transition from open to closed and closed to open, respectively, at the same rate. The supply-valve actuator 126 can be operated such that the transition of the pair of supply valves happens over a controlled period of time.

For example, ninety seconds may be required for the pair of supply valves (122, 124) transition from open to closed and closed to open depending on the size of the valves, the size of the pump 110, the diameter of the pump output-line 114, and the speed at which a liquid is flowing through the GHX system 10. These factors all contribute to the volume of liquid that is traversing the GHX system 10 as the valves are being actuated. The greater the volume of flow per period of time the longer the transition for the pair of supply valves (122, 124) transition from open to closed and closed to open will take in order to not introduce water hammer in the GHX system 10. Large volume systems can require two or more minutes for the valve transition.

The first supply valve 122 is coupled to a well return port 128 of the apparatus 100. The second supply valve 124 is coupled to a well supply port 130 of the apparatus 100. The flow of liquid from pump 110 can thereby be directed to either well supply port 130 or well return port 128 depending on the actuation of the first supply valve 122 and second supply valve 124. Nominally, the well supply port 130 can be coupled to the supply manifold 12 and the well return port 128 can be coupled to the return manifold 16.

In a similar manner to the pair of supply valves (122, 124), a first return valve 132 is coupled to the well return port 128 and a second return valve 134, is coupled to the well supply port 130. Accordingly, the first return valve 132 is also coupled to the first supply valve 122, and the second return valve is also coupled to the second supply valve 122. At the portion of the valves opposite the well supply port 130 and the well return port 128, the first return valve 132 and the second return valve 134 are coupled at a T-joint that is in fluid communication with the fluid reservoir 102.

A return filter 138 can be disposed between the pair of return valves (132, 134) and the fluid reservoir 102. The return filter 138 can optionally be introduced or excluded from to flow of liquid to the fluid reservoir 102 depending on the actuation of three manual butterfly valves 140 as depicted in FIG. 1.

A flow velocity dissipation mechanism 142 can be disposed in the fluid reservoir 102 and configured to receive the liquid passing through either or both of the return filter 138 or one of the pair of return valves (132, 134). The flow velocity dissipation mechanism 142 can reduce air or gas entrainment in a liquid as it enters the reservoir 102. The flow velocity dissipation mechanism 142 can include inner pipe 144 and an outer pipe 146 in a concentric orientation and both being partially disposed in the reservoir 102. The inner pipe 144 is capped at one end, receives liquid through the end opposite the cap, and includes a plurality of openings 148 formed in the inner pipe such that fluid is directed to the space between the concentric pipes. The outer pipe 146 is open at both ends, such that when the velocity dissipation mechanism is oriented vertically in the reservoir 102 air or gasses in the liquid coming from the GHX system 10 can escape through the upper opening inner pipe 144 and the outer pipe 146 as the liquid drops into or fills the reservoir 102.

The first return valve 132 and second return valve 134 are configured and coupled to the return-valve actuator 136 such that if the first return valve 132 is fully open the second return valve 134 is fully closed. Likewise, when the second return valve 134 is fully open the first return valve 132 is fully closed. When the return valves transition from open to closed and closed to open the return-valve actuator 136 operates on each valve simultaneously such that the pair of valves transition from open to closed and closed to open, respectively, at the same rate. The return-valve actuator 136 can be operated such that the transition of the pair of return valves happens over a controlled period of time.

As with the pair of supply valves (122, 124), the transition from open to closed and closed to open for the pair of return valves (132, 134) will take place over a sufficient period of time to not introduce water hammer in the GHX system 10. The actuation of the pair of supply valves (122, 124) the pair of return valves (132, 134) can be coordinated such that the pump 110 can continue to operate while the pairs of valves are actuated, thereby causing a reversal of the direction of flow of a liquid being pumped though the GHX system 10.

The management and coordination of the valve actuation can be accomplished with the use of a controller 150 in electronic communication with the supply-valve actuator 126 and the return-valve actuator 136. The controller 150 is also in electronic communication with the VFD 112 to control the operation and speed of pump 110, as well as the temperature sensor 116, pressure sensors 118, and fluid flow meter 120. The controller 150 can include a wireless transceiver 152 configured to communicate with a wireless pressure sensor assembly 154.

The wireless pressure sensor assembly 154 can be equipped with a wireless transmitter and a pressure sensor or transducer. The wireless pressure sensor assembly 154 can be coupled to the GHX system 10 at a location remote from the apparatus 10 such that the pressure in the GHX system can be communicated wirelessly to the controller 150. In this manner the wireless pressure sensor assembly 154 can be located at the point closest to the buried piping that is accessible for a fluid connection. This point is typically proximate to the supply manifold 12 or the return manifold 16 which can include one or more ports configured to couple with a pressure sensor for testing purposes. The controller 150 can utilize this primary GHX system 10 pressure signal from the wireless pressure sensor assembly 154 connected to the System at the lowest possible point in the System, thereby obtaining an accurate reading of the various buried pipe circuits of the GHX system that terminate in or near a building or structure housing the supply manifold 12 or the return manifold 16.

The apparatus 100 can precisely manage pressure and flow rates in the GHX system 10 to maintain desired testing/operating functions while protecting the system 10 from potentially damaging water hammer or over pressurization. In addition to preventing water hammer through the simultaneous and controlled actuation of the supply and return valves (122, 124, 132, 134), collectively the set of flow redirection valves, the apparatus 100 includes a bypass valve 156 and a pair of electronic pressure relief valves 158 that are coupled to the output of pump 110. Upon activation, the bypass valve 156 and the electronic pressure relief valves 158 can divert liquid from the output of pump 110 to a return conduit 160, thereby reducing the flow rate or pressure in the GHX system 10. The electronic pressure relief valves 158 can be electronically coupled to the controller 150, either through a hardwired connection or wirelessly, such that upon the detection of an overpressure situation at pressure sensor assembly 154 the controller can activate one or both of the electronic pressure relief valves 158 in order to prevent damage to the GHX system 10.

The bypass valve 156 can be a variable position valve such that a percentage of the flow rate provided from the output of pump 110 can be controlled more precisely than by adjustment to the VFD 112 alone. For example, at initial startup of the system 100 the bypass valve 156 can be fully open, thereby diverting the flow from pump 110 to the reservoir 102 while allowing the pump 110 to be operated at a speed that may be more efficient (e.g., faster) than the flow rate needed to gradually begin the flushing process. Over a period of time (e.g., 30 seconds) the bypass valve 156 can gradually be closed, thereby increasing the flow rate from the pump 110 to the GHX system 10. The controller 150 can monitor the flow rate by the fluid flow meter 120 and continue to adjust the position of the bypass valve 156 with an actuator coupled to the bypass valve 156.

The computer controlled actuation of the bypass valve 156 in combination with the feedback provided from the fluid flow meter 120 can allow the system 100 to safely flush, filter, and fill GHX systems of a variety of sizes. A single residential system with a relatively small volume of buried piping may only require a fluid flow of 10-50 gallon per minute. Alternatively, a large commercial system with large diameter piping and multiple underground bores may require hundreds of gallons per minute of flow to effectively flush and clean the system. These systems, an any in between these ranges, can be accommodated by configured the controller 150 to operate the pump 110 and the bypass valve 156 to achieve the desired flow rate and pressure level.

In an alternative embodiment, the pump 110 can be operated at its most efficient speed, without the use of a VFD. The flow rate through the GHX system 10 can be controlled only by the position of a bypass valve 156 in combination with a controller 150 electrically coupled to an actuator coupled to the bypass valve 156, and a fluid flow meter 120 to provide feedback to the controller 150.

Additionally, the apparatus 100 can establish, though performance of a testing regimen, that a desired operating criteria of the GHX system 10 had been attained and that the GHX system 10 was not been exposed to undesirable pressure events. During the operation of the apparatus 100 all data from the sensors (116, 118, 120, 154), the pump 110 operating parameters, as well as the activation of any of the flow reversal, bypass, and redundant pressure relief devices can be recorded in a tangible non-volatile computer readable memory. This recorded data can then be transferred to a separate computing platform to generate a detailed report of the operation and testing of the GHX system by the apparatus 100.

Methods of filtration and purging of the heat transfer fluid or other liquid in a GHX system 10 can be achieved through repetitive, high velocity flushing (at a rate greater than 2 ft/sec) of the liquid from the apparatus 100, to the GHX system 10, and back to the apparatus 100, where the liquid is discharged into the top of the reservoir 102. This process can be repeated for various durations or for multiple cycles until the GHX system 10 is satisfactorily purged of air or unwanted debris.

Suction from the main pump 110 pulls the liquid through the dual 30-mesh basket strainers 104 located at the bottom of the reservoir 102, and then pumps the liquid back into the GHX system 10. An apparatus 100 flow capacity of 750 gallons per minute (GPM) can provide capacity to assure dependable filtration and purging of the fluid in GHX piping diameters up to twelve inches. This capacity can encompass most possible GHX configurations but changes in the capacity or configuration can be made according to GHX requirements. A relatively constant flow velocity can be achieved through the use of continuously back flushing type strainers which prevent flow restriction due to strainer blinding of filters in suction strainers 104.

Air can be purged from the fluid through the use of a discharge tube 144, mounted inside the reservoir 102, comprising multiple discharge ports 148 surrounded by a outer tube 146. Forcing air-entrained liquid through this apparatus can reduce fluid flow velocity into the reservoir 102, allowing air to be substantially disentrained and vented to the atmosphere, preventing reintroduction of the air into the suction strainers 104 and subsequently into the GHX system 10.

The velocity of the water as it enters an open atmospheric purge tank (e.g., reservoir 102) can be reduced to minimize the reintroduction of air through into the pump suction through the use of a Velocity Reduction Device, an example of which is depicted in FIG. 16. The Velocity Reduction Device can comprise a sealed end pipe 144 with holes to allow water to escape horizontally. The perforated pipe is disposed within another pipe 146 of larger diameter, and as water is discharged horizontally through the series of holes 148 of specific diameter, the water impacts the interior of the surrounding pipe and falls with reduced velocity into the water contained within the purge tank 208. An exemplary embodiment of the suction strainers 104 are also depicted in FIG. 16.

Figure 24:
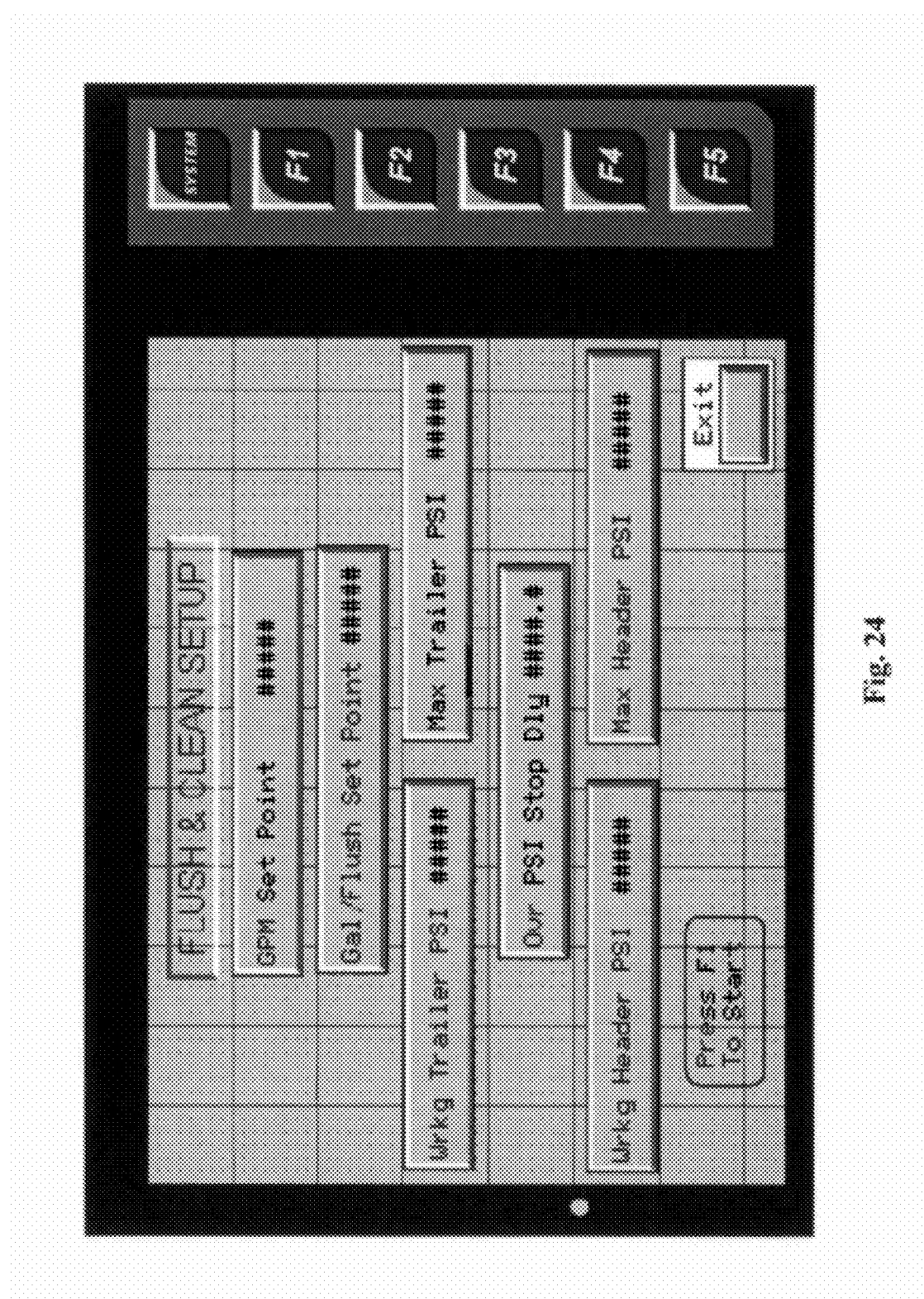
FIG. 24 depicts an embodiment of a HMI interface to setup a flush & clean operation.

During operation, the controller 150 can be configured to automatically switch to a failsafe operation, which can include an activation of a pressure release bypass 156 and pump 110 shutdown if the pressure signal data from the pressure sensor assembly 154 to the controller 150 is interrupted. A failsafe pressure, that is the maximum pressure to be exerted on the GHX system 10 at any time, can be monitored and controlled by controller 150. The Failsafe Pressure set point can be entered into the PLC via a human machine interface (HMI) 158. The controller 150 can monitor the pressure single continuously, and can be configured to immediately reduce GHX system pressure should the failsafe pressure be exceeded. The immediate reduction in pressure can be simultaneously provided through activation of relief valves 158 and manipulation of the operating speed of pump 110. The relief valves 158 can be configured in a redundant configuration. An example of a pair of relief valves 158 is depicted in FIG. 24.

The Fluid flow-reversal within the apparatus 100, when connected to GHX system 10, can be performed automatically by the controller 150 to eliminate the potential of water hammer which could be introduced by inconsistent human inputs. For example, the controller 150 can be configured to introduce a delay or phased implementation of valve or pump operation inputs in situations where those inputs would potentially harm the GHX system 10. Manual relief valves can also be included for an operator to override system operation in an emergency or in case of a power failure.

Figure 18:
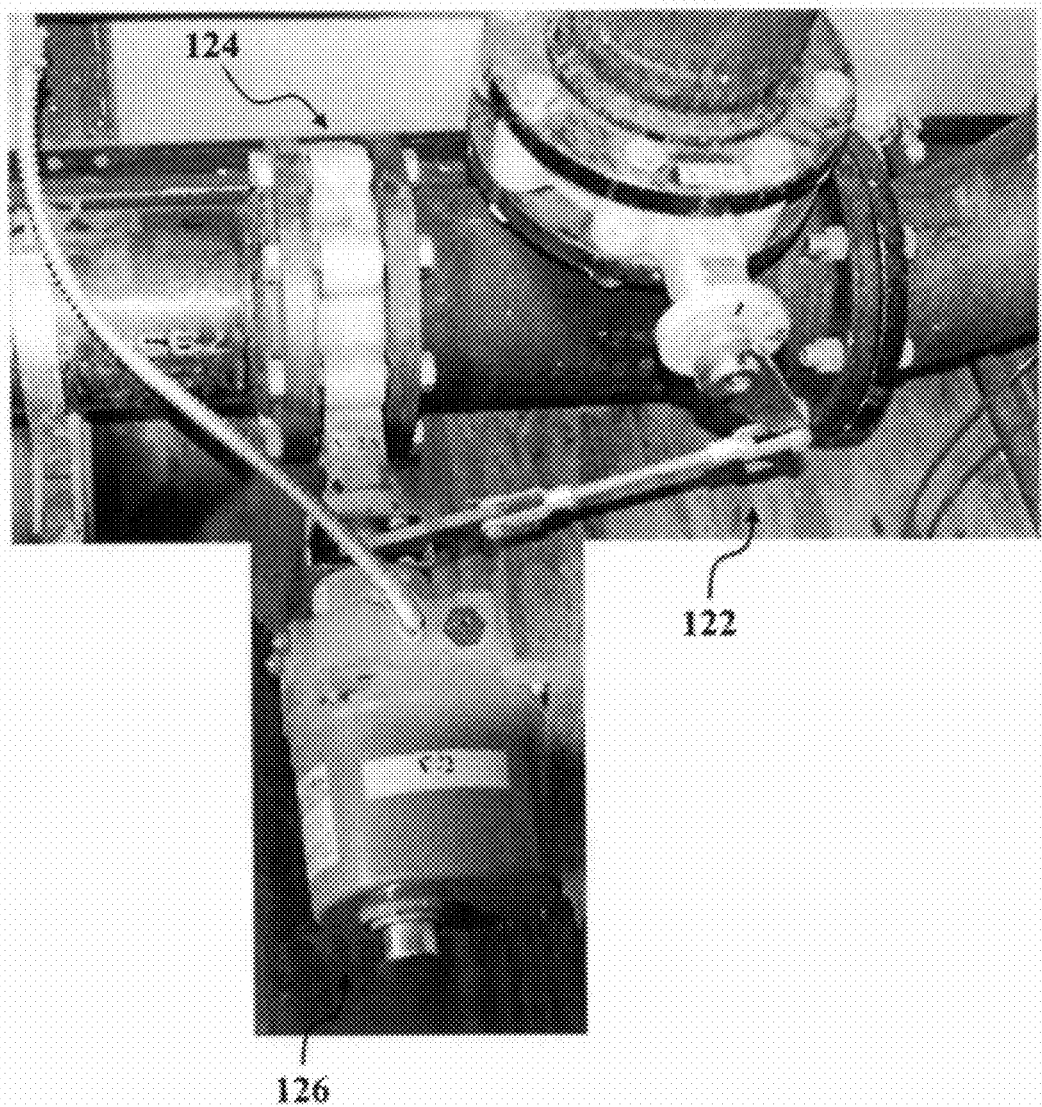
FIG. 18 depicts a first pair of reversing valves of an embodiment of the invention.

The speed of the actuation of the automatic flow redirection valves (V1 and V2), examples are depicted in FIGS. 18 and 19, can be deliberate and gradual, controlled by the controller 150. The flow reversal can occur without the need for flow velocity reduction of pump 110. The GHX system 10 can also be protected from water hammer or over-pressurization through automatic bypass of flow from the output of the pump 110 to a surge tank or reservoir 102 for the duration of the redirection valve actuation. The output of pump 110 can be controlled through the use of an automatic bypass valve 156. The bypass valve 156 can also be controlled by the controller 150 to regulate the overall flow rate of fluid from the pump 110 by diverting excess flow into the reservoir 102.

The flow reversal setpoint (i.e., total flow measurement) in which flow is redirected and the peak flow setpoint can be entered into the controller 150 via the HMI 158. The peak flow can be gradually and deliberately obtained, to prevent water hammer, through the simultaneous manipulation of a pump drive frequency and bypass valve actuation. The apparatus 100 can automatically discontinue flow upon reaching the Total Flow set point. The Total Flow Set Point can be entered into the controller 150 via HMI 158. These settings can be used to automate the testing and data-logging operations during GHX system 10 purging and leak testing, thereby reducing or eliminating the possibility of human error or while fully documenting the purging and testing process with electronically recorded data.

The totalized gallons flowed through the GHX system 10, can be continuously recorded utilizing an automatic data logging device coupled to a flow measurement device. The gallons per minute, as obtained at any point in time, be also continuously recorded utilizing an automatic data logging device included with the controller 150. Additionally, the pressure measurements, as obtained from the lowest point in the GHX system 10, and the pressure measurement and temperature values, as obtained at the pumping apparatus, can be continuously recorded utilizing an automatic data logging device. All of the data values can be stored on a non-volatile memory such as a magnetic disk or flash memory for later analysis or archival.

High-Pressure Test Circuit

Apparatus 100 also can include a pressure pump 170 that has an output that is coupled to a pressure output port 172. The pressure output port can be coupled to either the supply manifold 12 or the return manifold 16 of the GHX system 10. Alternatively the pressure pump 170 can be coupled to either the well supply port 130 or the well return port 128 such that the separate pressure output port 172 is not required.

The input to pressure pump 170 is in fluid communication with filters 104 such that liquid can be drawn by the pump 170 from reservoir 102. A bypass valve 174 is also in fluid communication with the output of the pressure pump 170 such that liquid can be redirected away from the pressure output port 172 and back into the reservoir 102. The bypass valve 174 can be coupled to and actuated by an electronic valve actuator that is in electronic communication with controller 150.

The system 100 can also include a freshwater intake port 180. Flow of water into the system 100 can be regulated by an intake valve 182. Intake valve 182 can be regulated by an actuator in electronic communication with the controller 150. The controller can allow water to flow into the reservoir 102 in response to input from a plurality of fluid level sensors 184 that can be mounted at various heights along the side of reservoir 102. Preferably, the system 100 should be configured maintain a fluid level in the reservoir 102 above the top surface of the filters 104 in order to prevent air from being drawn into the filters 104 and pumped into the GHX system 10 via the pump 110 or pressure pump 170.

In accordance with the ASTM F2164-02 standard, pressure in a GHX system can be maintained (within +/−2 psi) while also accommodating any increasing volume due to pipe expansion under pressure. PE pipe is known to expand in generally unpredictable amounts under pressure which can change the total volume of the GHX system 100 during a pressure testing operation, thereby calling into question the validity of a pressure test. The Apparatus 100 can automatically add a quantity of water, as often as required, whenever the pressure within the GHX system 10 drops below a set point. The automatic water addition can be limited such that the addition is complete when the PLC detects that the configured GHX upper pressure set point is again met. Any additions of fluid to the GHX system can be logged for later review to determine if the GHX system has behaved within the desired parameters.

Exemplary Embodiments

Referring to FIGS. 2 through 6, one potential embodiment of apparatus 100 can be constructed of a variety of pipe and pump sizes and in a configuration that provides convenient access to the components in case where a need to repair or replace is needed. The various pumps, valves, actuators and assemblies are shown in FIGS. 2-6 from various perspectives with portions omitted to detail one exemplary embodiment of the apparatus 100.

FIGS. 7 through 8b-2 depict diagrams of one potential embodiment of apparatus 100. The various pumps, valves, actuators and assemblies are depicted with exemplary piping and valve dimensions. Other larger or smaller dimensions are contemplated for systems with greater or smaller capacity as required.

FIGS. 9-13 depict a schematic diagram of one embodiment of the assembly. The various valves, sensors and electrical connections detail the one exemplary embodiment of a GHX purge, test and fill apparatus.

Figure 14B:
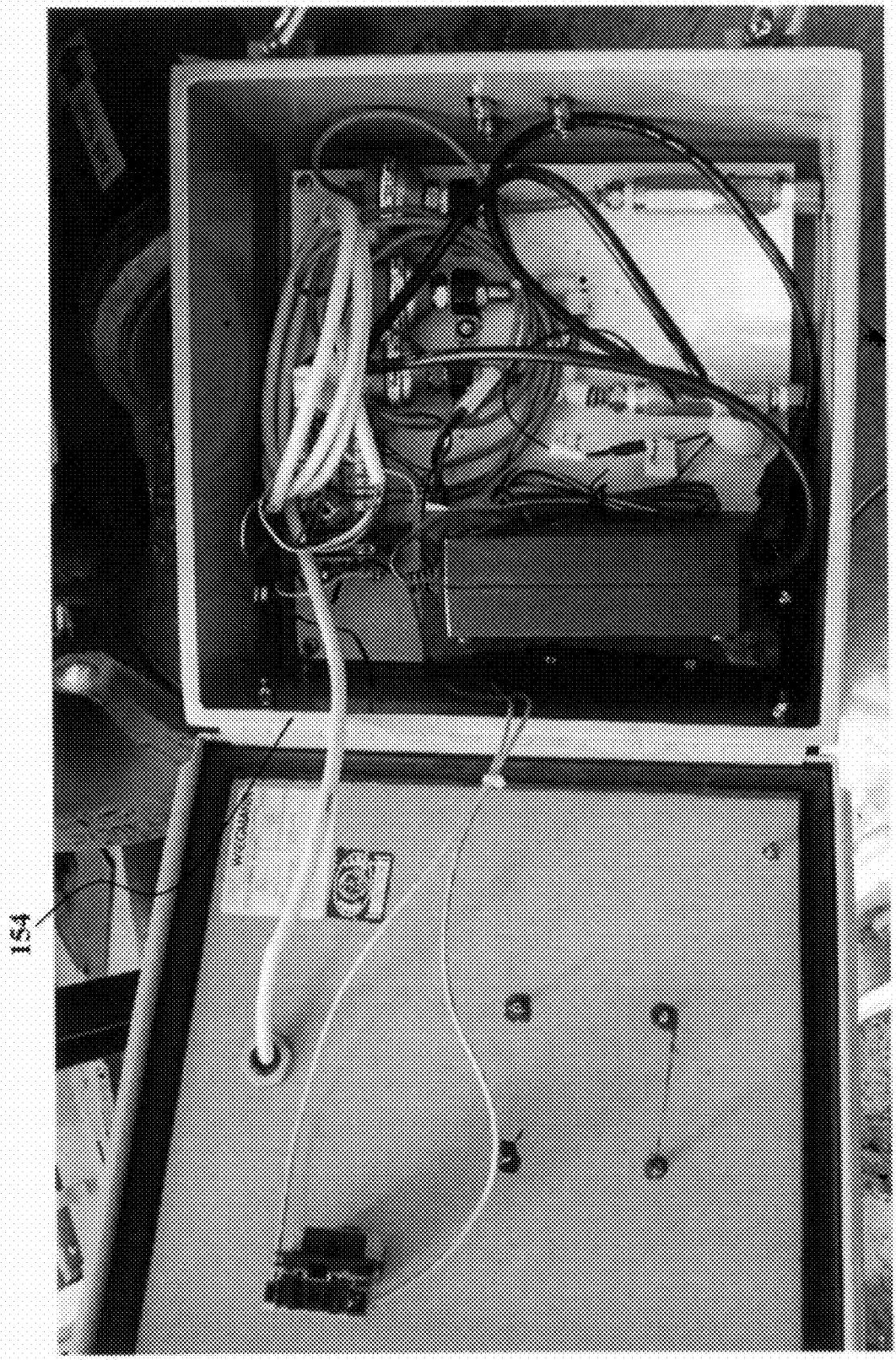
FIG. 14b depicts a remote PT and transmitter interior of an embodiment of the invention.

FIGS. 14a and 14b depicts an embodiment of a remote pressure transducer assembly 154 and transmitter. A pressure transducer can utilize relatively small diameter tubing to couple to the lowest available connection point in the GHX. By coupling a pressure transducer at this low point, away from the pump and filter assemblies housed on the mobile trailer, a more accurate reading of the true pressure in the GHX system 10 can be obtained. The pressure data can be transmitted back to the controller 150, providing accurate feedback and test data that can be monitored and recorded. The controller 150 can also compare the pressures sensed from the remote pressure transducer couple to the GHX and the local pressures that can be monitored near the pumps. The pressure transducer assembly 154 can include multiple pressure sensors/transducers that can be coupled to both the intake manifold 12 and the return manifold 16 of a GHX system to provide multiple measurements of the pressure in the GHX system 10.

Referring to FIGS. 15a through 15d, an exemplary embodiment of the apparatus 100 mounted on a single truck transportable trailer 198. FIG. 15a depicts hoses/tubing coupled to a GHX manifold assembly in order to provide fluid communication between the GHX system and the exemplary apparatus 100. The large diameter tubing provides for an adequate volume of fluid flow through the system in order to flush or purge the system of air and debris.

The various pumps, electrically operated valves, electrical panels, variable-frequency drives, controllers, and Human Machine Interface (HMI) can be housed within a weather tight walk-in compartment 200. A generator 202, fuel supply 204, hose storage 206, and atmospheric purge tank 208 can be mounted outside of compartment 200. The apparatus 100 can be electrically self-contained, requiring only electrical energy supplied by the onboard generator 202.

With the exception of a few manually operated emergency relief/shutdown valves, the apparatus 100 can be electrically operated and controlled. An onboard diesel generator 202, rated for approximately 50 kW, can supply sufficient power for the exemplary apparatus 100. The controller 150 can be a programmable logic controller (PLC) having continuous data logging capabilities and a HMI 158. The PLC can include programmed instructions, stored in a tangible, non-volatile, machine-readable memory such as flash memory or a magnetic disk, to control the pumps, valves, actuators and ancillaries. The HMI can include a touch screen interface or other conventional user-input device. The PLC can be coupled to various data connection ports such as Wi-Fi, USB, Ethernet, or other appropriate data connections to send and receive data, reports or program instructions. Both the pressure pump 170 and the main circulating pump 110 of the apparatus 100 can be controlled by VFDs coupled to the PLC.

Referring to FIG. 16, interior strainer filters 104 can be of continuous self-cleaning design where a fluid source is randomly directed about the interior of strainer filter 104 to force any debris off of the exterior of the filters 104.

User Interface

Figure 21:
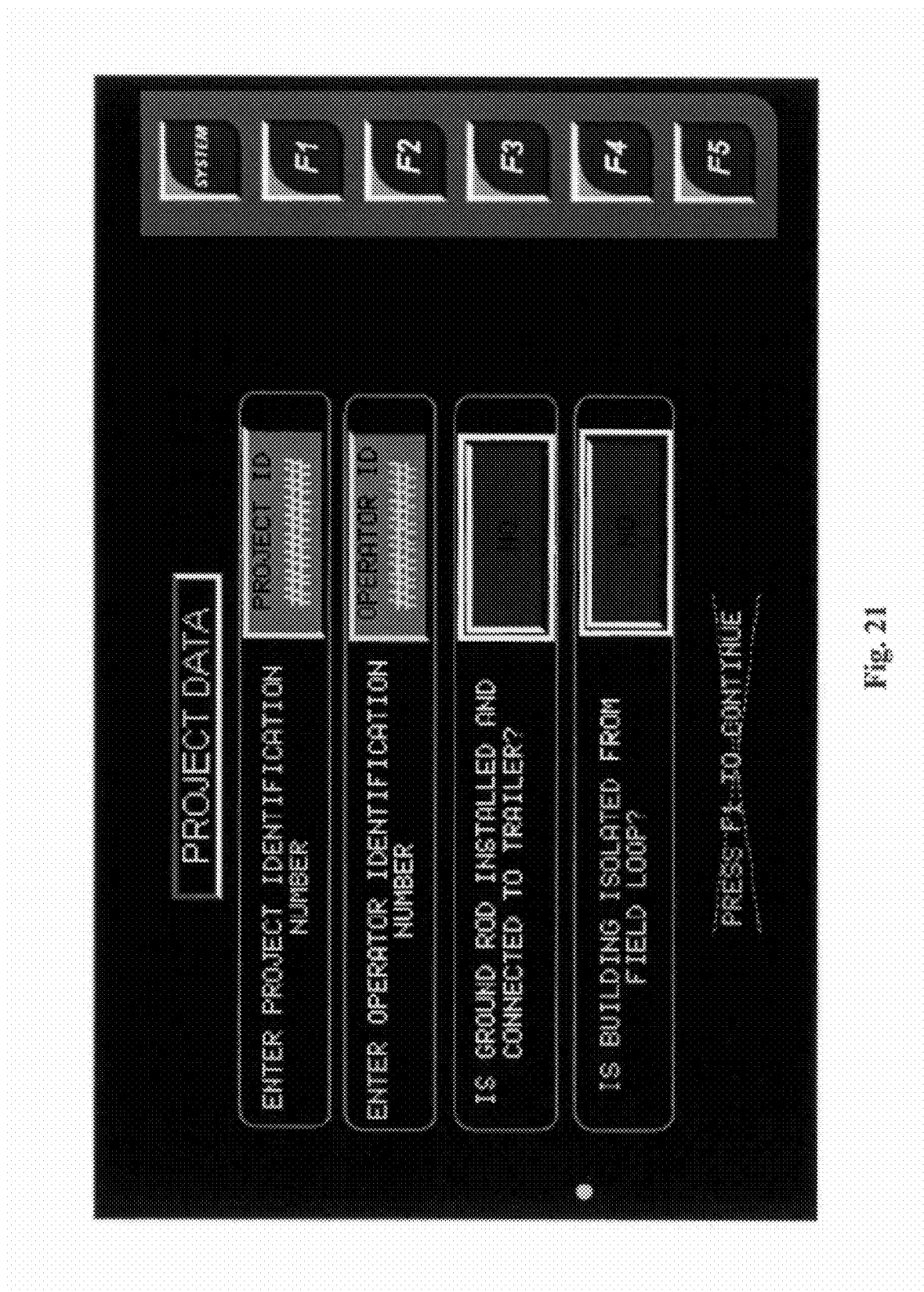
FIG. 21 depicts an embodiment of a human machine interface (HMI) project setup screen according to an embodiment of the invention.

The following is an example a sequence of operation of a purging unit and HMI operation according to one embodiment of the invention. FIG. 21 depicts an exemplary startup preparation screen where a user enters the following information:

Operator ID# (Numeric value)
Project # (Numeric value.)
Is Ground Rod Installed and connected to Trailer? YES/NO
Is the building Isolated from Field Loop? YES/NO The Operator ID and project number must contain entered data, and "Yes" answered to Ground Rod and Building Isolation questions before the system 100 will allow the user to advance to the next menu and begin operation of the system 100.

Figure 22:
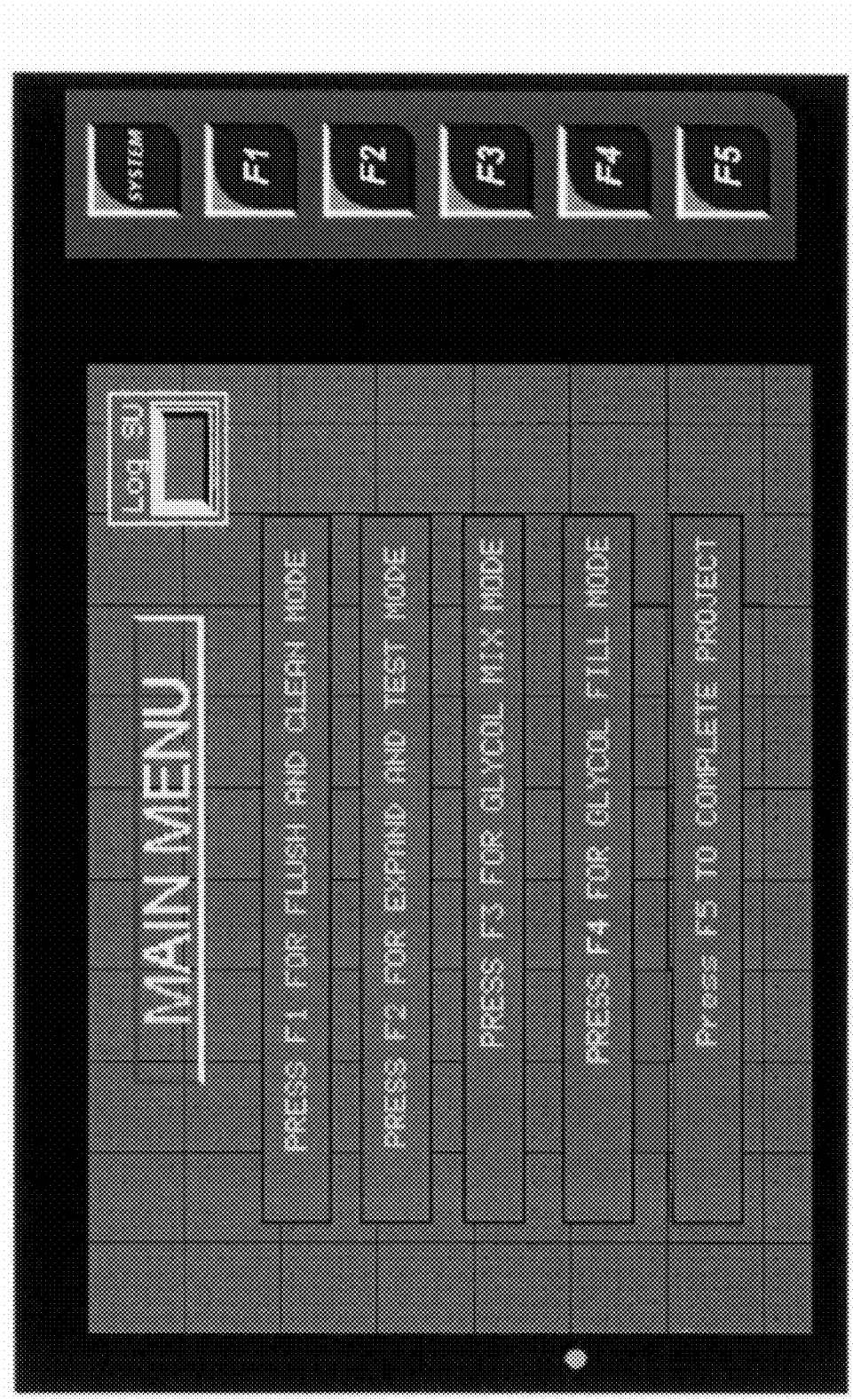
FIG. 22 depicts an embodiment of a HMI menu.

An exemplary Main Menu screen, screen is shown in FIG. 22. The Main Menu can permit the operator to select one of several modes including: Flush & Clean Mode, Flush & Clean Setup, Expansion & Test Mode, Expansion & Test Setup, Glycol Fill Mode, Glycol Fill Setup, Glycol Mixing Mode, Glycol Mixing Setup, and Project Complete.

The operator can select the appropriate or desired mode and the HMI screen will change accordingly. This menu can appear after a preparation screen and prompt the operator to enter in the various set points for flows, pressures and time bases for a project.

Figure 23:
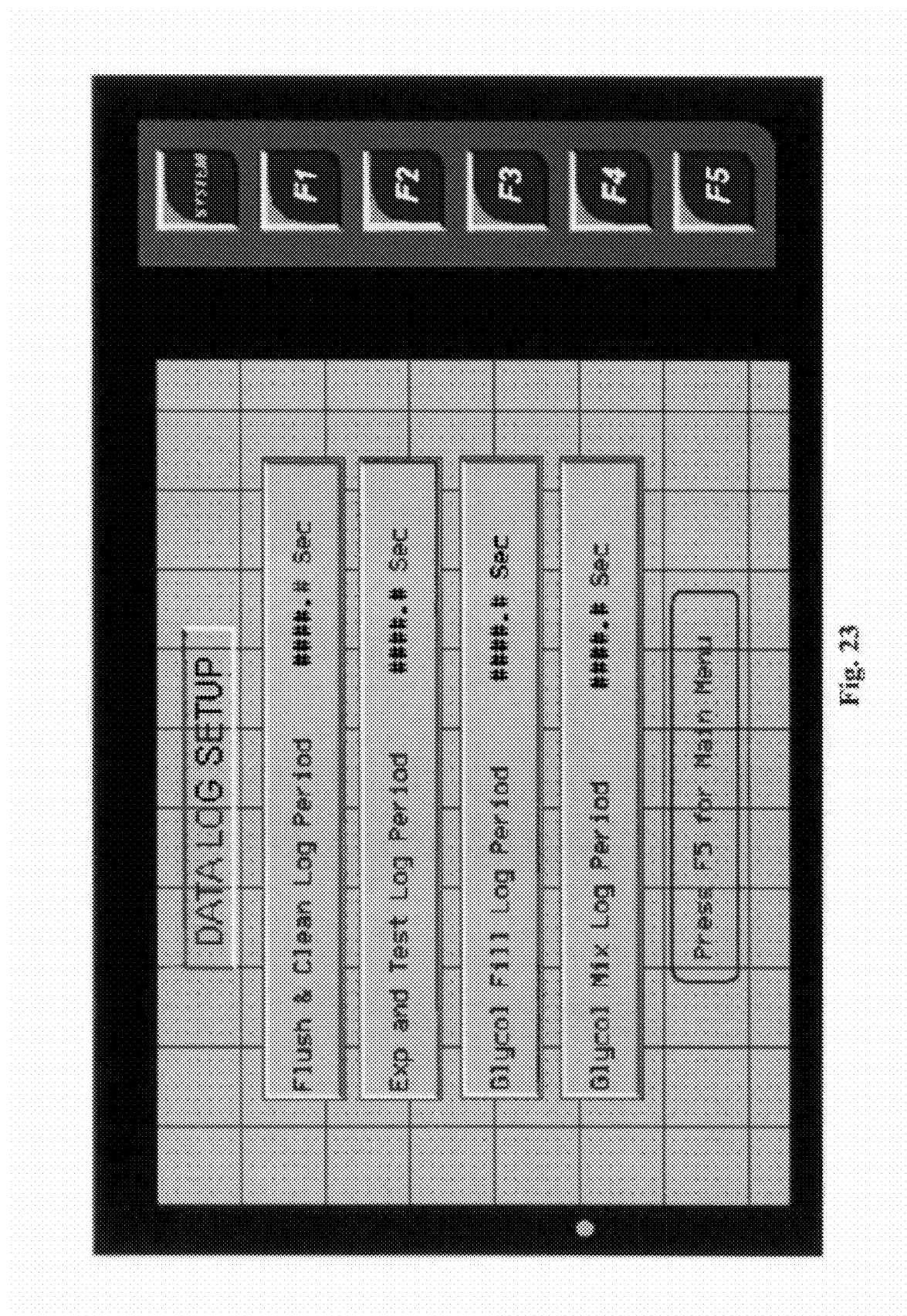
FIG. 23 depicts an embodiment of a HMI data logging menu.

Referring to FIG. 23, a Data Logging Setup Page will permit the entry of the following parameters: Logging period for Flush and Clean Mode, Logging period for Expansion and Test Mode, Logging period for Glycol Fill mode, and Logging period for Glycol Mixing mode.

All inputs and outputs to the system 100 can be logged. All screen setup and set points can be logged. The setup screen can allow the owner/operator to select the time base intervals for the data capturing. This logging time base can be in seconds or another appropriate or user configured time base. The data file can be downloaded to a laptop or other computing device through an Ethernet or USB port. An exemplary software package such as EnvisionFX, available from Horner APG, of Indianapolis, Ind., can facilitate the download. This data file can be a .csv format file that can be imported into an appropriate spreadsheet or database. The data file can bear the Project Number as its Title. At the start of each phase a line will be added to the file indicating the time of day and a label indicating the mode name. Then next line will display the Time of day, and the scaled values of all mode appropriate set points for the described mode in data columns from left to right.

Referring to FIG. 24, an operator can setup the desired parameters for a flush and cleaning operation on a GHX system. An exemplary Flush & Clean screen can include settings for the following setpoints: GPM Flow Rate Setpoint, Gallons/Flush Setpoint, Critical Pressure Setpoint" at the mobile system (trailer), Critical Pressure Setpoint" at the GHX system header, Working Pressure Setpoint at the mobile system, Working Pressure Setpoint at the GHX system header, and a "STOP Delay Time Setpoint" to allow system to calibrate or correct itself after a timeout or other alarm.

At the completion of each data logging period thereafter, as determined by the parameters entered into the Data Logging Setup Page, a line will be added to the file listing the Time of day, and the scaled values of the analog data in ascending order as columns within the line for each sensor (e.g., Temperature Sensor, Pressure Sensor P1, Pressure Sensor P2, Pressure Sensor P3, Pressure Sensor P4, Pressure Sensor P5 and Flow Sensor). Data Logging can be stopped if the mode is terminated or at the completion of the mode's sequence, whichever is more appropriate. If a mode is restarted the appropriate headers and data will be added to the project file.

Figure 25:
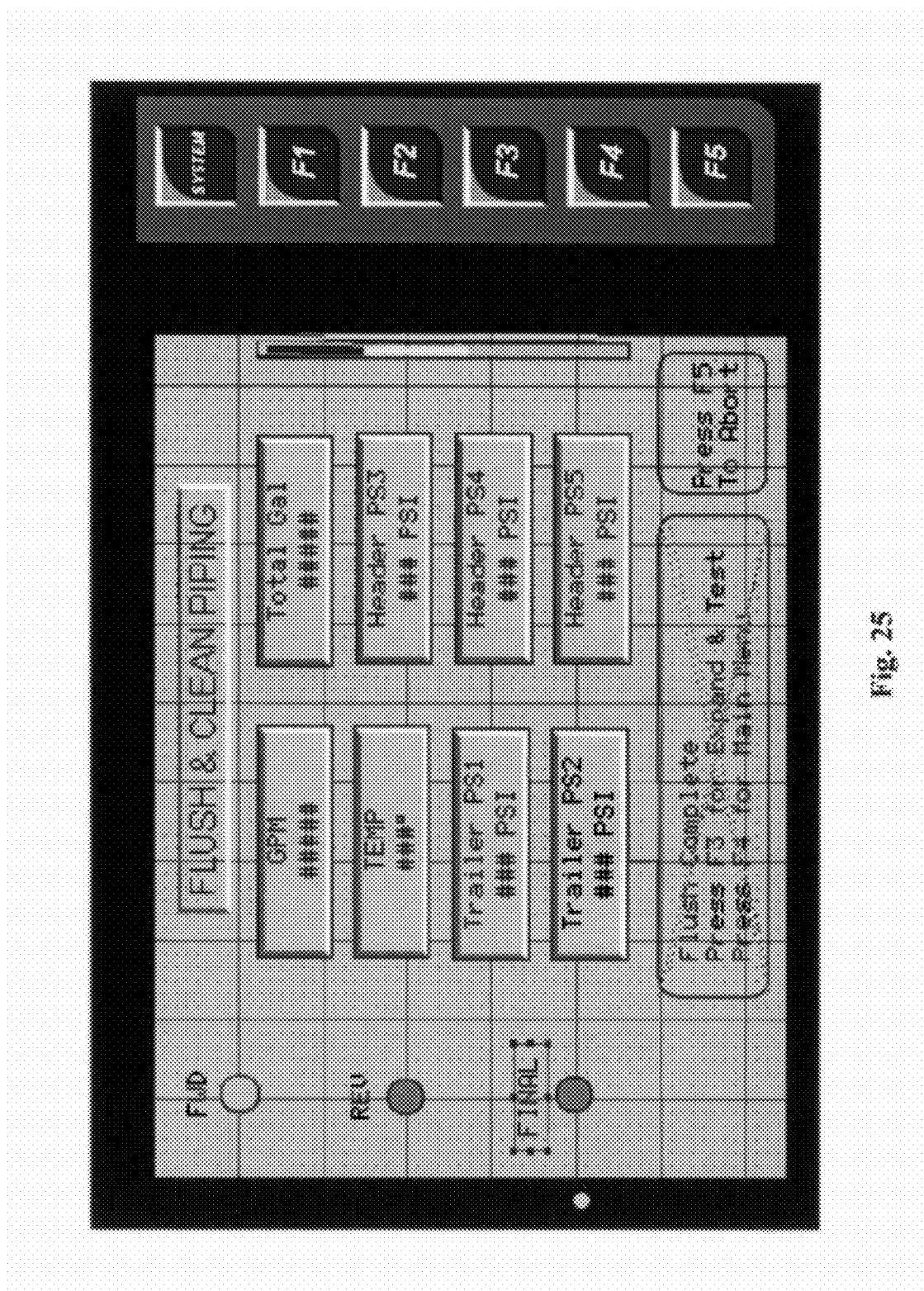
FIG. 25 depicts an embodiment of a HMI status screen for a flush & clean operation.

As shown in FIGS. 24 and 25, when the Flush and Clean setup mode is selected a data input screen is presented that permits the operator to check the assigned values for the project:

OK/Edit "GPM Flow Rate Setpoint"
OK/Edit "Gallons/Flush Setpoint"
OK/Edit "Critical Pressure Setpoint" at the trailer
OK/Edit "Critical Pressure Setpoint" at the well header
OK/Edit "Working Pressure Setpoint" at the trailer
OK/Edit "Working Pressure Setpoint" at the well header
OK/Edit "STOP Delay Time Setpoint" to allow system to correct itself The Critical Pressure is a pressure that will cause immediate shut down of the Unit. Working Pressure is a pressure above which the stop delay timer will be started. The Stop Delay time, when exceeded will stop the unit.

Select "FLUSH Start" on the touch screen and flushing should start after a slight delay.

Valves V1 and V2 will be set for "Forward" flow. After a short time delay (e.g., 3-5 seconds) Pump P1 will Start. The pump will try to achieve the GPM set point while monitoring water levels in the storage tank and the working and critical pressures. The screen changes to present the current values of all sensors and the appropriate indicators of mode status.

When the desired number of gallons has run through the system the PLC will reverse the Flush direction. The pump does not need to stop, V1 & V2 valves will be set to "Reverse Flow" and the process can repeat the desired gallons of flush again.

Figure 32:
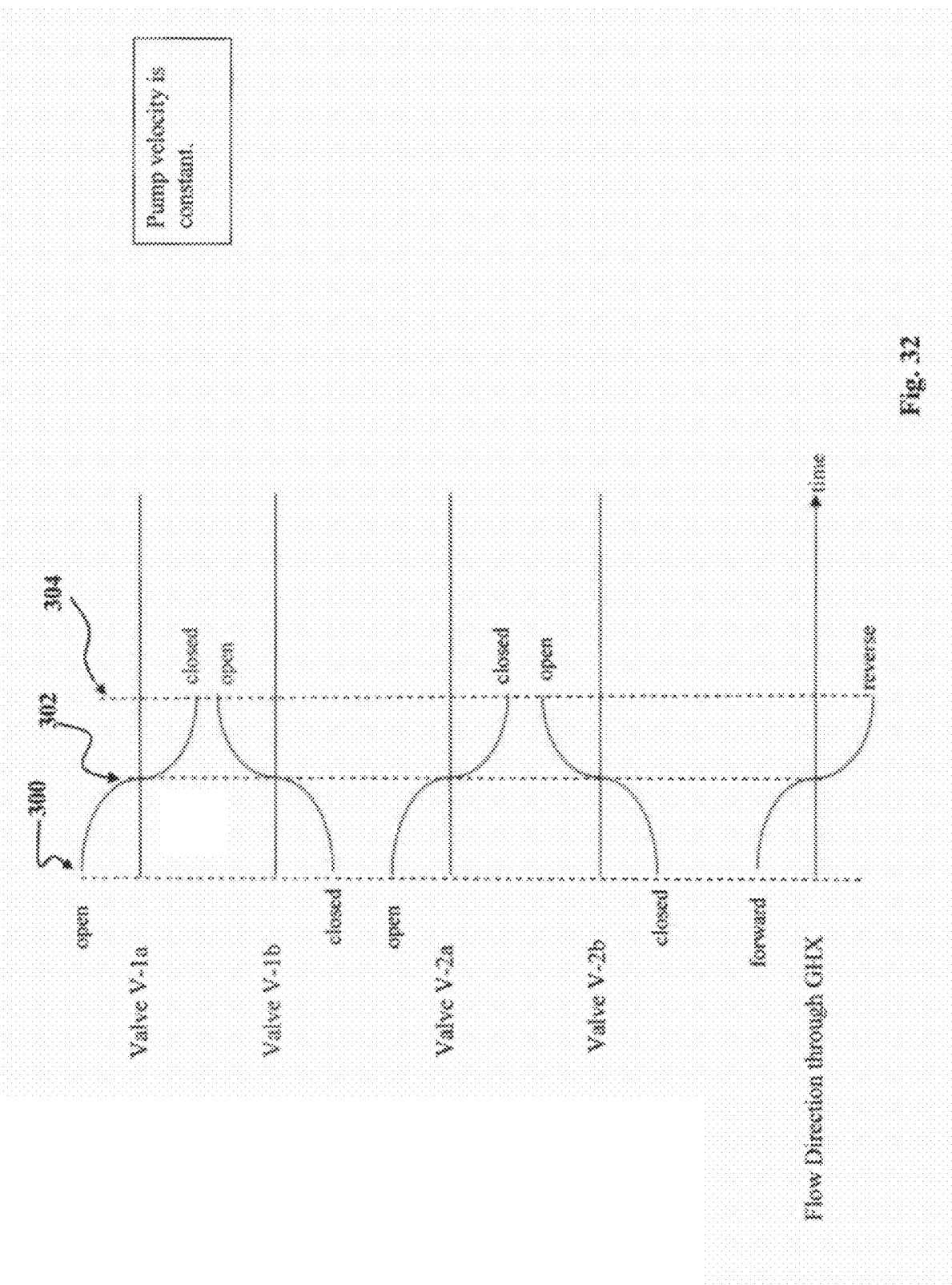
FIG. 32 depicts the sequence of reversing valve transitions and the corresponding change in flow direction in a GHX system with a constant high-volume pump velocity.

When the number of gallons has run through the system in reverse flow direction the PLC can again reverse the flush. The pump does not need to stop, V1 & V2 valves will be set to "Forward Flow" and the process can repeat the desired gallons of flush again. The operation of the pairs of V1 and V2 valves with respect to the direction of flow through the GHX system is generally depicted in FIG. 32. When all four valves V1a, V1b, V2a, and V2b are at 50% the flow rate though the GHX system should be zero with all pump output being directed through the purge tank.

When the flushing process has been completed a screen will appear asking the operator to repeat the flush again or start the "Expansion/Testing" phase of the work or return to the "Main Menu". The operator can select a re-flush option to repeat the system flushing process. If the operator selects "Expansion/Testing" the system can began the next phase of the process.

Figure 26:
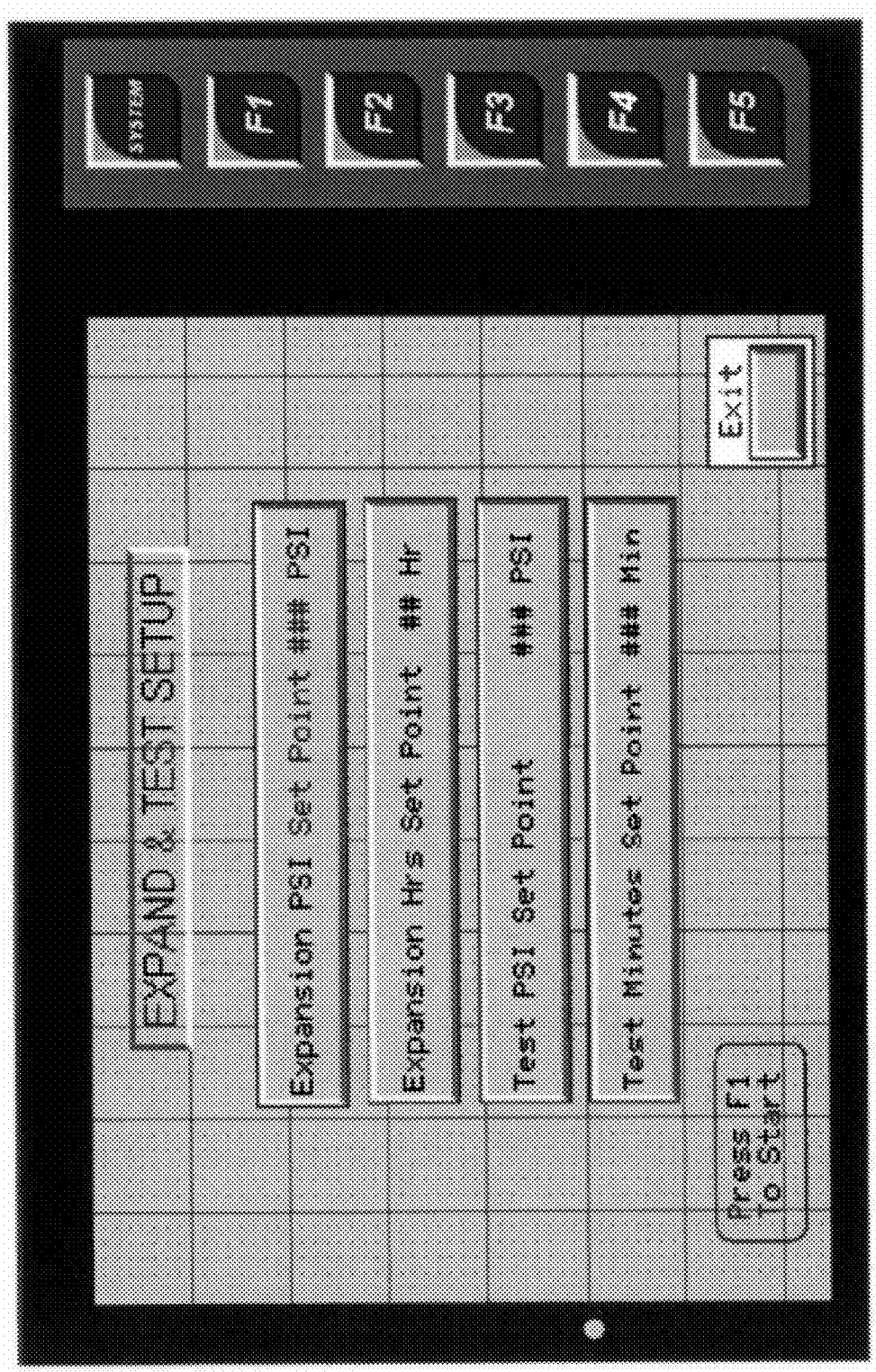
FIG. 26 depicts an embodiment of a HMI interface to setup a pressure test operation.
Figure 27:
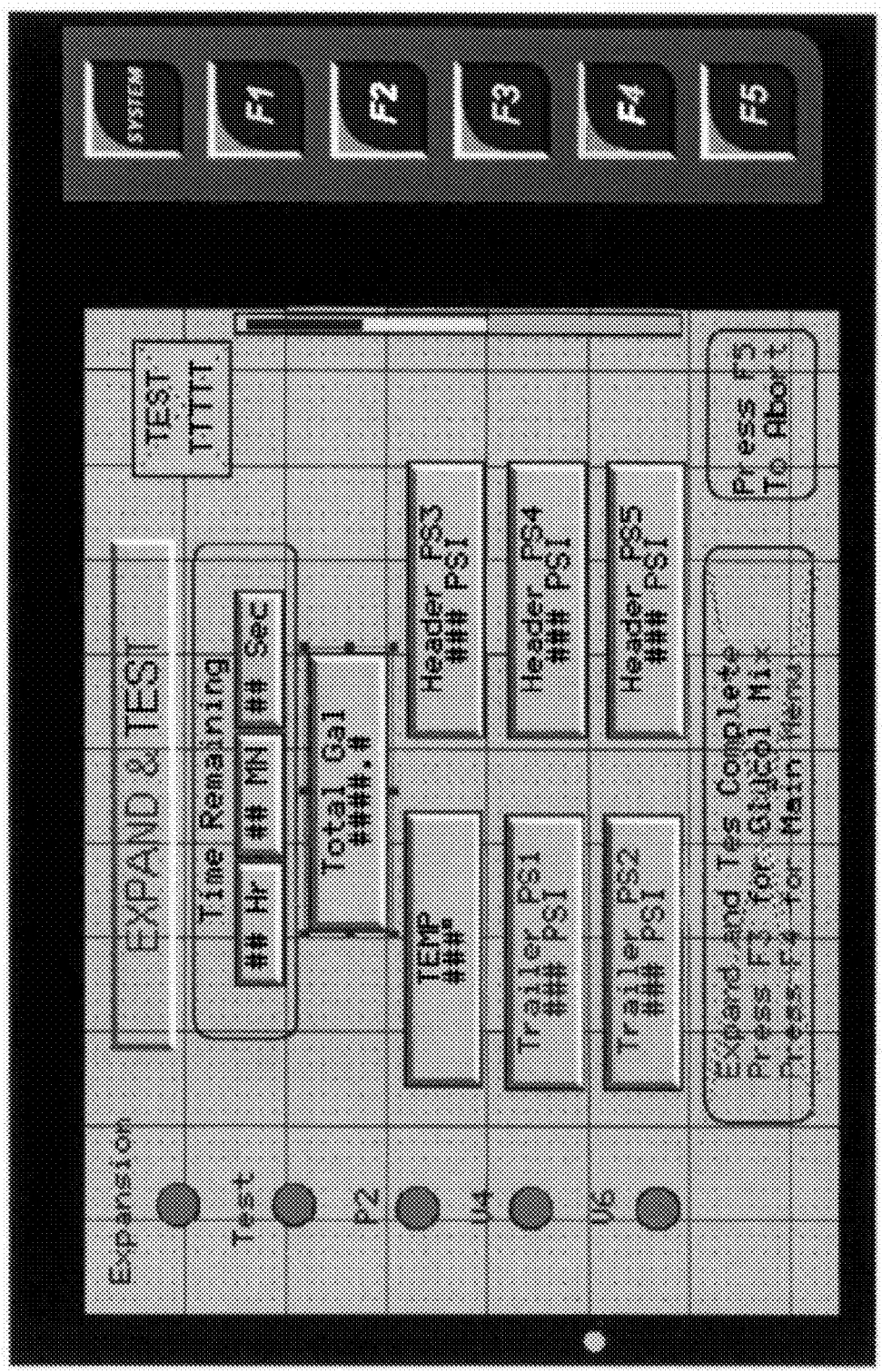
FIG. 27 depicts an embodiment of a HMI status screen for a pressure test operation.

Referring to FIGS. 26 and 27, when "Expansion/Testing" has been selected a screen to allow the operator to set the parameters for this phase of the process will appear. The operator can Approve (OK) or Edit the following data: Expansion Pressure Set Point (Operating Pressure pump will maintain during expansion period), Expansion Time (Duration of Expansion process in hours), Test Pressure Set Point (Pressure system must stay within ±5% of setpoint during Test period or it has failed), Test Time (Duration of test period in minutes).

The operator can be presented a START button on the screen to begin the process. The screen then changes to provide readout of all pressures and indicators of appropriate mode status. Pump P2 will start and pressurize the field loop to the desired pressure, maintaining the pressure setpoint by starting P2 as needed to make up for pressure drop. This will start/stop pressure pump 170 as needed until the expiration of the expansion time. Pressure pump 170 will then be locked out and the high-pressure bypass valve will open until the system pressure drops to the Test Pressure Set Point. Valve high-pressure bypass will then close and hold until the Test Time has elapsed. At the end of the test a pressure relief valve to the purge tank will open to relieve the system pressure to zero. At the completion of the test the screen will register the pressure difference and allow the operator to return to the menu screen.

Figure 28:
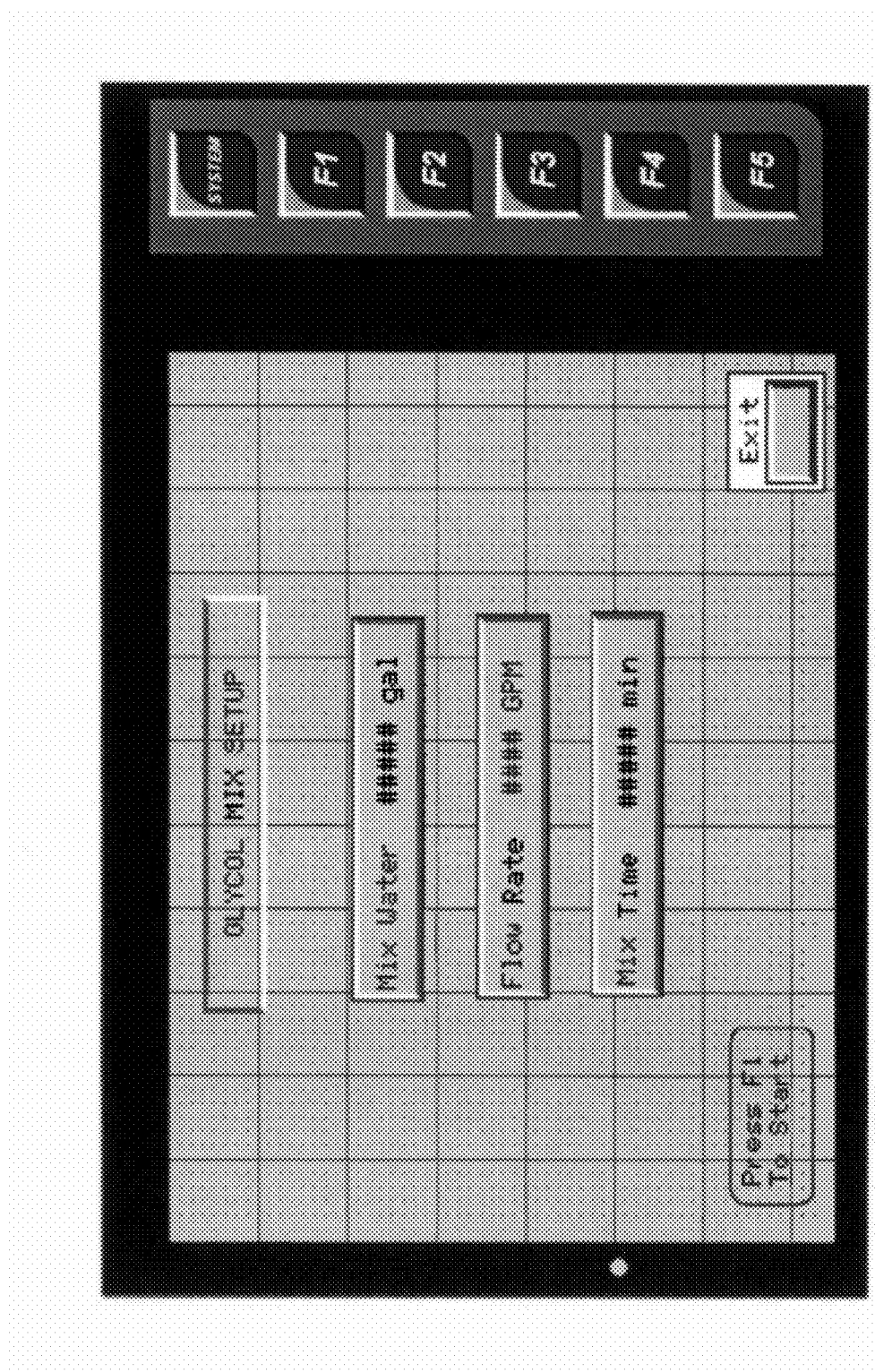
FIG. 28 depicts an embodiment of a HMI interface to setup a heat exchange fluid mixing operation.
Figure 29:
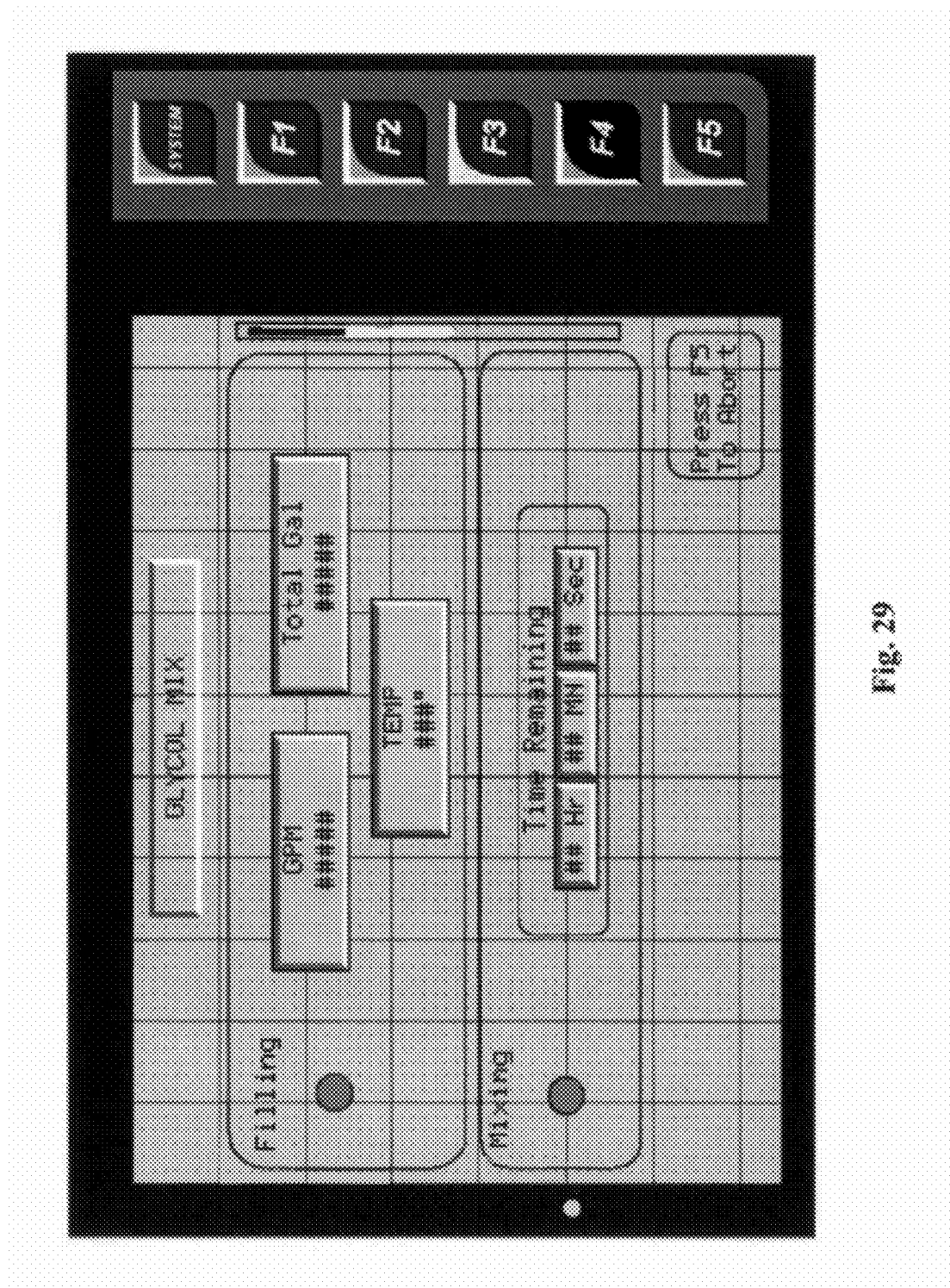
FIG. 29 depicts an embodiment of a HMI status screen for a heat exchange fluid mixing operation.

Referring to FIGS. 28 and 29, in the Glycol Mixing Phase the operator can isolate the suction side of the pressure pump 170 so the pump can draw a measured amount of portable water and pump it into the tank. This amount can be logged by the controller. The operator can set a pump flow rate for this procedure. The operator can set a time base for mixing the product before he can pump it into the well system.

Figure 30:
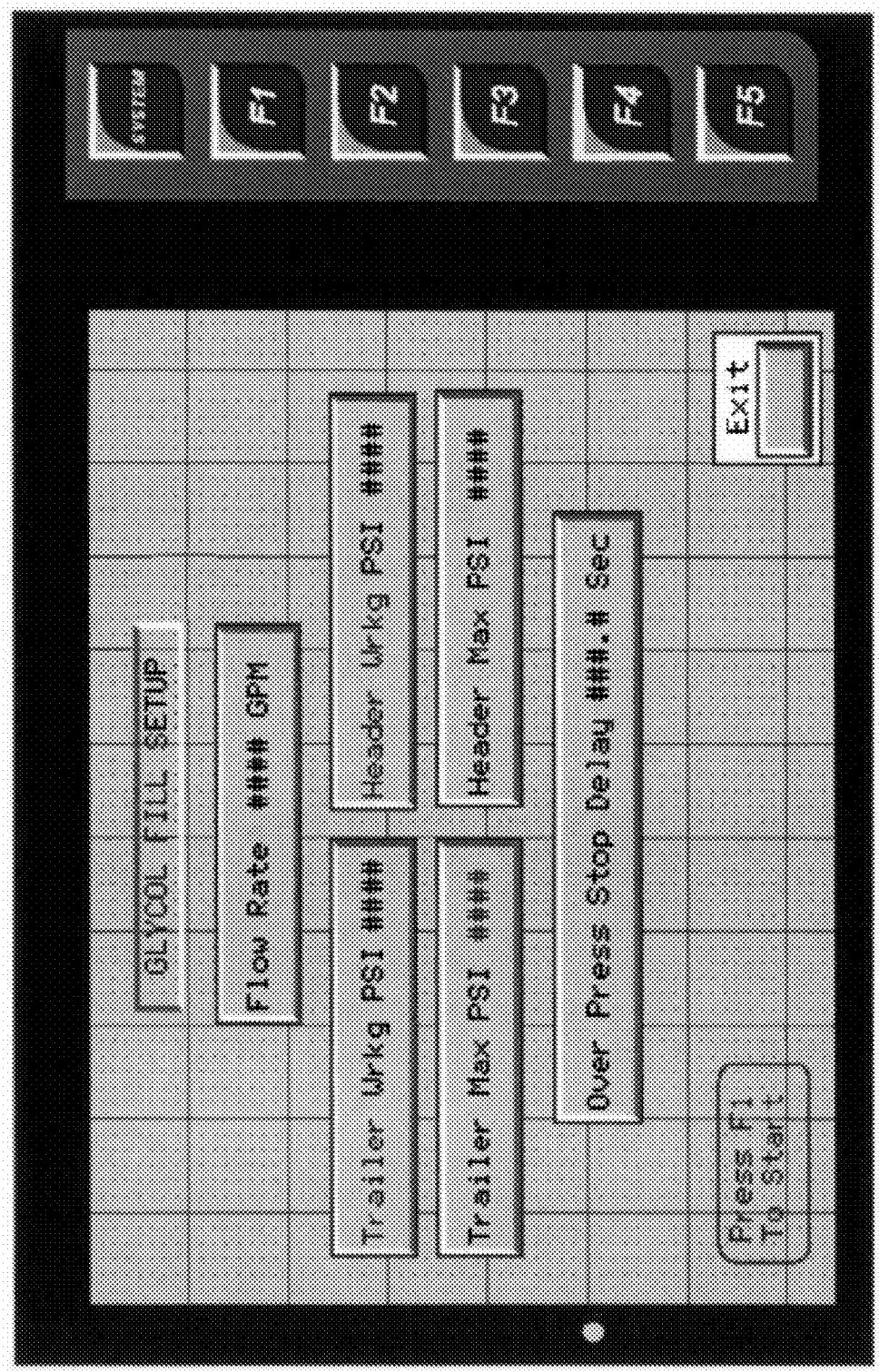
FIG. 30 depicts an embodiment of a HMI interface to setup a heat exchange fluid fill operation.
Figure 31:
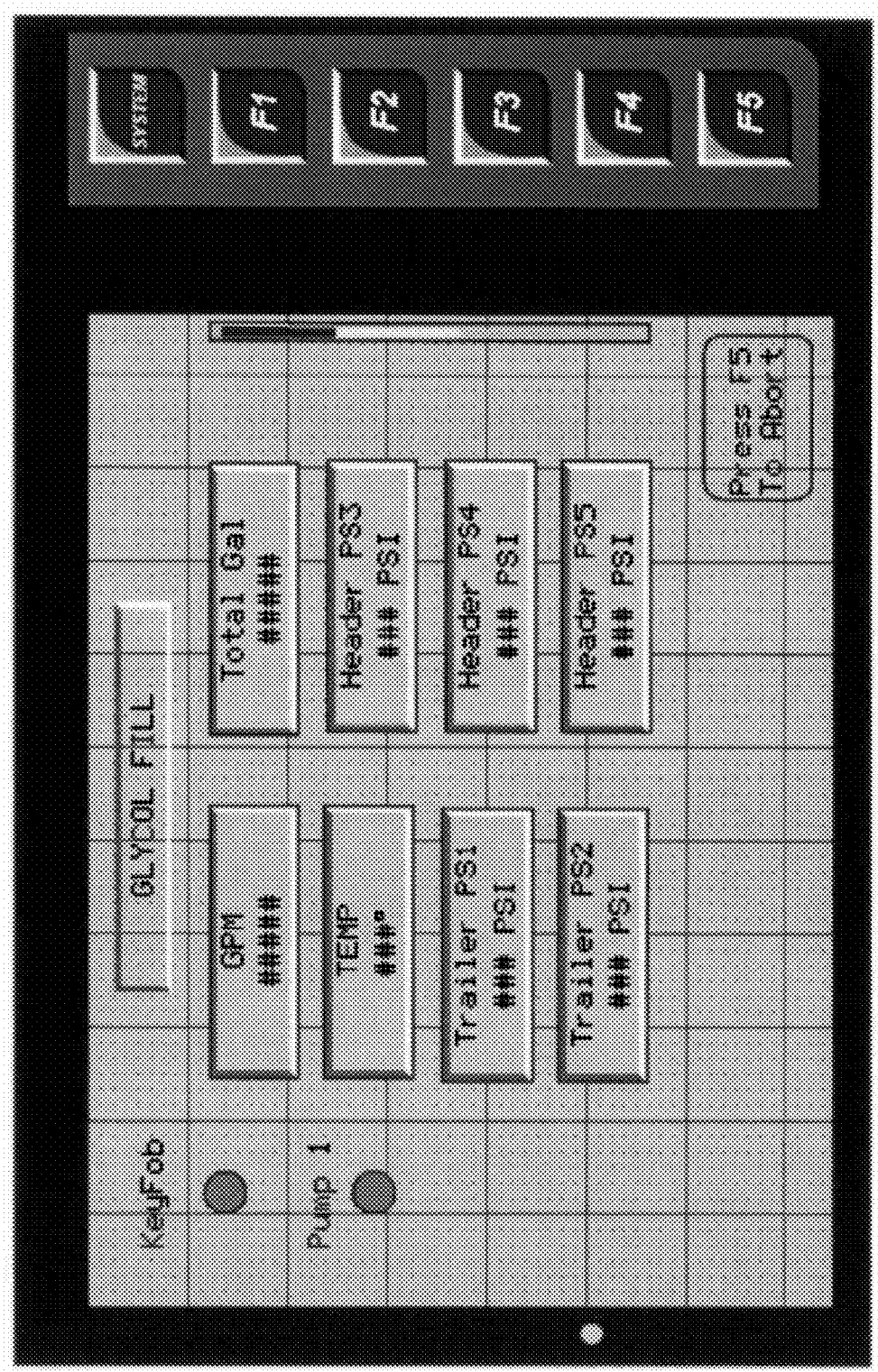
FIG. 31 depicts an embodiment of a HMI status screen for a heat exchange fluid fill operation.

Referring to FIGS. 30 and 31, in the Glycol Filling Phase when the "Filling" phase is selected a screen will appear so the operator can OK or change the flow and pressure parameters. Pressure parameters can include, GPM Flow Rate Setpoint, Gallons/Flush Setpoint, Critical Pressure Setpoint at the trailer, "Critical Pressure Setpoint" at the GHX header, and "Working Pressure Setpoint" at the trailer, "Working Pressure Setpoint" at the GHX header, and "STOP Delay Time Setpoint" to allow system to correct itself.

The system 100 can include a remote controller device, such as a keyfob, to allow an operator to start/stop the various processes remotely. A phase can run until the operator selects "Done" on the HMI screen. The level monitoring and auto filling can function automatically whenever the system is in the Flushing/Cleaning mode and the filling mode.

When used herein, "attached to" or "mounted on" does not require direct component to component contact and intermediate components may be used while still meeting the "attached to" and "mounted to" limitations. "Platform" can be a trailer bed, a truck bed, framework associated with a trailer or a truck, a pallet with skids or no skids, the floor of a truck trailer.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:

1. A mobile verification system, for use with a geothermal system that includes a ground heat exchanger, one or more heat pumps, and a system of air handling and distribution, the mobile verification system comprising:
    a fluid supply reservoir having an input to receive a supply of liquid and a reservoir output;
    a pressure supply port configured for removable connection to the ground heat exchanger of the geothermal system;
    an electrically driven pressure-pump having an output in fluid communication with the pressure supply port, and an input in fluid communication with the reservoir output;
    a pressure sensor coupled to the ground heat exchanger of the geothermal system;
    a bypass valve coupled to the output of the pressure pump and an input of the fluid supply reservoir, such that, when the bypass valve is in an open configuration, the output of the pressure pump is directed to the fluid supply reservoir;
    an electronic bypass actuator coupled to the bypass valve and controlled by a bypass signal;
    a controller in electronic communication with the pressure-pump, the pressure sensor, and the bypass actuator;
    wherein the controller is configured to activate the pressure pump, monitor the pressure sensor, and maintain a pressure setpoint in the ground heat exchanger of the geothermal system by actuation of the bypass valve such that fluid from the fluid supply reservoir is injected into the ground heat exchanger of the geothermal system if the controller receives a pressure reading from the pressure sensor that is below the pressure setpoint.

2. The mobile purging system of claim 1, wherein the controller and the pressure sensor are in communication via a wireless link.

3. The mobile verification system of claim 1, further comprising:
    a pressure supply valve disposed between, and in fluid communication with, the pressure-pump and the pressure supply port, such that the output of the pressure-pump is delivered to the pressure supply port when the pressure supply valve is open.

4. The mobile verification system of claim 1, further comprising:
a pressure relief valve disposed between and in fluid communication with the pressure supply port and the fluid reservoir;
wherein the pressure relief valve is activated by the controller if the controller receives a pressure reading from the pressure sensor that is greater than a predetermined maximum pressure.

5. The mobile verification system of claim 1, further comprising:
a pressure sensor disposed between the pressure pump and the pressure supply port in fluid communication with the ground heat exchanger.

6. The mobile verification system of claim 1, further comprising:
a variable frequency drive coupled to the pressure pump and in electronic communication with the controller such that the controller can regulate a speed at which the pressure pump operates.

7. A pressure testing system comprising:
a fluid reservoir;
a pump having an inlet in fluid communication with the fluid reservoir and an outlet in fluid communication with a pressure supply port, the pressure supply port being configured to be placed in fluid communication with a geothermal system that includes a ground heat exchanger, one or more heat pumps, and a system of air handling and distribution;
a bypass valve positioned between the outlet of the pump and the pressure supply port, the bypass valve being configured to selectively direct at least a portion of a fluid discharged from the pump back to the fluid reservoir and thereby bypass the outlet;
a pressure sensor configured to measure a pressure within the ground heat exchanger of the geothermal system; and
a controller configured to:
control the bypass valve to add pressurized fluid to the ground heat exchanger of the geothermal system via the outlet until a pressure reading from the pressure sensor indicates that the pressure within the ground heat exchanger of the geothermal system reaches a set point;
upon reaching the set point, controlling the bypass valve to direct the fluid discharged from the pump back to the fluid reservoir;
monitor the pressure within the ground heat exchanger of the geothermal system via the pressure sensor while the fluid discharged from the pump is directed back to the fluid reservoir via the bypass valve; and
upon determining that the pressure within the ground heat exchanger of the geothermal system has fallen below a threshold, control the bypass valve to direct the fluid discharged from the pump to the ground heat exchanger of the geothermal system, thereby increasing the pressure within the ground heat exchanger of the geothermal system back up to the set point.

8. The system of claim 7, wherein the pump is an electrically driven pump having a variable-frequency drive (VFD) and the controller is configured to control a speed of the pump based on the pressure within the ground heat exchanger of the geothermal system measured via the pressure sensor.

9. The system of claim 8, further comprising an electronic valve actuator in electronic communication with the controller and configured to control the bypass valve.

10. The system of claim 7, wherein the outlet port is in fluid communication with the ground heat exchanger of the geothermal system and the ground heat exchanger of the geothermal system comprises polyethylene piping that expands under pressure.

11. The system of claim 7, wherein the pressure sensor is configured to communicate wirelesly with the controller.

12. The system of claim 11, wherein the pressure sensor is located remotely from the fluid reservoir, pump, bypass valve, and controller and is positioned at a location proximate where buried piping of the ground heat exchanger of the geothermal system is accessible for fluid connection.

13. The system of claim 7, wherein the controller is configured to monitor the pressure within the ground heat exchanger of the geothermal system via the pressure sensor and control the bypass valve to maintain a pressure within +/−2 psi of the set point.

14. The system of claim 7, wherein the controller is configured to receive and log data received from sensors related to pressure testing.

15. The system of claim 14, wherein the controller is configured to receive and log the pressure within the ground heat exchanger of the geothermal system measured by the pressure sensor, a speed of the pump, a fluid flow rate, and a position setting of the bypass valve.

16. A method comprising:
injecting pressurized fluid from a fluid reservoir into a ground heat exchanger of a geothermal system, the geothermal system also including one or more heat pumps and a system of air handling and distribution, via a pump until a pressure within the ground heat exchanger reaches a set point;
upon reaching the set point, controlling a bypass valve positioned between the pump and the ground heat exchanger to direct fluid discharging from the pump toward the fluid reservoir instead of toward the ground heat exchanger;
monitoring the pressure within the ground heat exchanger while fluid discharging from the pump is directed toward the fluid reservoir; and
upon determining that the pressure within the ground heat exchanger has fallen below a threshold, controlling the bypass valve to direct at least a portion of the fluid discharging from the pump to the ground heat exchanger, thereby increasing the pressure within the ground heat exchanger back up to the set point.

17. The method of claim 16, further comprising adjusting a speed of the pump based upon the pressure within the ground heat exchanger.

18. The method of claim 16, wherein the ground heat exchanger comprises polyethylene piping that expands under pressure.

19. The method of claim 16, further comprising measuring the pressure within the ground heat exchanger via a pressure sensor is configured to communicate wirelessly.

20. The method of claim 19, further comprising positioning the pressure sensor at a location proximate where buried piping of the ground heat exchanger is accessible for fluid connection.

21. The method of claim 16, wherein further comprising maintaining the pressure within the ground heat exchanger via control of the bypass valve within +/−2 psi of the set point.

22. The method of claim 16, further comprising logging data received from sensors related to pressure testing.

23. The method of claim 22, wherein logging data comprises logging the pressure within the ground heat exchanger, a speed of the pump, a fluid flow rate, and a position setting of the bypass valve.

* * * * *